(12) United States Patent
Yoshioka

(10) Patent No.: US 7,904,675 B2
(45) Date of Patent: *Mar. 8, 2011

(54) CACHE MEMORY, SYSTEM, AND METHOD OF STORING DATA

(75) Inventor: Shirou Yoshioka, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/498,623

(22) Filed: Jul. 7, 2009

(65) Prior Publication Data

US 2009/0271575 A1 Oct. 29, 2009

Related U.S. Application Data

(62) Division of application No. 11/898,601, filed on Sep. 13, 2007, now Pat. No. 7,574,572, which is a division of application No. 11/137,560, filed on May 26, 2005, now Pat. No. 7,287,123.

(30) Foreign Application Priority Data

May 31, 2004 (JP) ................................ 2004-161830

(51) Int. Cl.
*G06F 12/00* (2006.01)

(52) U.S. Cl. ......... 711/156; 711/119; 711/128; 711/133; 711/144; 711/E12.016

(58) Field of Classification Search ........................ None
See application file for complete search history.

(56) References Cited

U.S. PATENT DOCUMENTS

| 5,906,000 | A | 5/1999 | Abe et al. |
|---|---|---|---|
| 6,038,647 | A | 3/2000 | Shimizu |
| 6,687,790 | B2 | 2/2004 | Zager et al. |
| 6,725,334 | B2 | 4/2004 | Barroso et al. |
| 7,287,123 | B2 * | 10/2007 | Yoshioka ...................... 711/133 |
| 7,574,572 | B2 * | 8/2009 | Yoshioka ...................... 711/156 |
| 2003/0014595 | A1 | 1/2003 | Doteguchi et al. |

(Continued)

FOREIGN PATENT DOCUMENTS

EP 0 322 888 7/1989

(Continued)

OTHER PUBLICATIONS

Notice of Allowance and Notice of Allowability dated Apr. 7, 2009 for U.S. Appl. No. 11/898,601.

(Continued)

*Primary Examiner* — Shawn X Gu
(74) *Attorney, Agent, or Firm* — Wenderoth, Lind & Ponack, L.L.P.

(57) ABSTRACT

A cache memory has a set associative scheme and includes a plurality of ways made up of entries, each entry holding data and a tag; a first holding unit holds, for each way, a priority attribute that indicates a type of data to be preferentially stored in that way; a second holding unit, included in a first way among the ways, holds, for each entry of the first way, a data attribute that indicates a type of data held in that entry; and a control unit replaces control on the entries by prioritizing a way whose priority attribute held by the first holding unit matches a data attribute outputted from a processor, wherein the control unit is further operable to store data into the entry of the way other than the first way.

4 Claims, 26 Drawing Sheets

U.S. PATENT DOCUMENTS

| | | |
|---|---|---|
| 2003/0131196 A1 | 7/2003 | Park et al. |
| 2004/0034740 A1 | 2/2004 | Britton et al. |
| 2007/0136530 A1 | 6/2007 | Tanaka |

FOREIGN PATENT DOCUMENTS

| | | |
|---|---|---|
| EP | 0 442 474 | 8/1991 |
| JP | 62-144257 | 6/1987 |
| JP | 01-173241 | 7/1989 |
| JP | 03-235144 | 10/1991 |
| JP | 04-100158 | 4/1992 |
| JP | 07-200412 | 8/1995 |
| JP | 09-160828 | 6/1997 |
| JP | 09-237225 | 9/1997 |
| JP | 11-259362 | 9/1999 |
| JP | 2002-342163 | 11/2002 |
| JP | 2003-030047 | 1/2003 |
| JP | 2004-078944 | 3/2004 |
| JP | 2004-110240 | 4/2004 |
| JP | 2004-145780 | 5/2004 |
| JP | 2004-326187 | 11/2004 |
| WO | 2005/048112 | 5/2005 |

OTHER PUBLICATIONS

Notice of Allowance and Notice of Allowability dated Jun. 13, 2007 for U.S. Appl. No. 11/137,560.

Office Action dated Aug. 1, 2008 for U.S. Appl. No. 11/898,601.

Office Action dated Jan. 5, 2009 for U.S. Appl. No. 11/898,601.

* cited by examiner

CACHE MEMORY, SYSTEM, AND METHOD OF STORING DATA

This application is a divisional application of application Ser. No. 11/898,601 filed Sep. 13, 2007 and now issued as U.S. Pat. No. 7,574,572, which is a divisional application of application Ser. No. 11/137,560, filed May 26, 2005 and now issued as U.S. Pat. No. 7,287,123.

BACKGROUND OF THE INVENTION (1) Field of the Invention

The present invention relates to a cache memory for storing plural data to be processed, system and method thereof.

(2) Description of the Related Art

A technique of dividing a cache memory into blocks and assigning each of the blocks to different programs with the view to increase a speed at which the cache memory accesses a main memory is disclosed for example in the Japanese Laid-Open Patent Application No. 62-144257.

With the technique described above, it has not been possible to effectively use a free area in another block since a block to be provided for a program is fixed. In the case where plural programs share data, they share a block as well, so that the data cannot be stored in a cache memory, or the block cannot be assigned to each of the programs. For example, in the case where two kinds of processing, one for moving picture and the other for audio, are simultaneously executed, the data that is being processed and that needs to stay in the cache memory has to be deleted. As a result, the number of times a cache miss occurs increases and the moving picture processing does not terminate within a predetermined time.

SUMMARY OF THE INVENTION

An object of the present invention is to provide a cache memory, a system and a method of storing data, with increased improvement such that processing for data of one type does not affect processing for data of another type, in the case of storing data of different types.

In order to achieve the above object, a cache memory according to the present invention is a cache memory that has a set associative scheme and comprises: a plurality of ways, each way being made up of entries, each entry holding data and a tag; a first holding unit operable to hold, for each way, a priority attribute that indicates a type of data to be preferentially stored in that way; a second holding unit which is included at least in a first way among the ways, and is operable to hold, for each entry of the first way, a data attribute that indicates a type of data held in that entry; and a control unit operable to perform replace control on the entries by prioritizing a way whose priority attribute held by the first holding unit matches a data attribute outputted from a processor, wherein when a cache miss occurs and in the case where (i) valid data is held in an entry of the first way among entries that belong to a set selected based on an address outputted from the processor, (ii) all of the following attributes match: the data attribute of the entry; the data attribute outputted from the processor; and the priority attribute of the first way, and (iii) an entry of a way other than the first way does not hold valid data, the entry being one of the entries that belong to the selected set, the control unit is further operable to store data into the entry of the way other than the first way.

With the above structure, an effective use of a cache memory can be realized since a way is allocated to data that has a priority attribute, and also, data that has a different attribute is stored into a vacant entry in the way. For example, in the case of storing different types of data, the efficiency can be enhanced without that one data processing affects another data processing. From the view point of processor, efficiency can be thus improved.

A process ID of a program may be used as the data attribute.

With the above structure, a configuration of the system can be simplified by using process IDs instead of data attributes that are normally used.

Upper bits of an address are used as the data attribute.

With the above structure, the structure can be simplified even in the system that does not use process IDs although upper bits and a data attribute needs to correspond to each other beforehand.

The cache memory may be accessed by processors, and a processor number may be used as the data attribute.

With the above structure, a processor to be prioritized can be set for each way, and management of cache memory can be simplified in a multi processor system.

The first holding unit may hold, for each way, priority attributes.

With the above structure, a vacant entry in the cache memory can be effectively used in the case where the processing for one priority attribute is executed exclusively to the processing for another priority attribute.

The cache memory is an instruction cache, and may include an invalidation unit operable to invalidate, when a process is killed, data of all the entries of the way whose priority attribute matches an attribute of data handled in the process.

With the above structure, effective use of cache memory can be improved since data (or instruction) that is not accessed any longer is invalidated at the time when the process is killed.

Each of the ways other than the first way may include a second holding unit.

The control unit includes a judging unit for each of the ways, and each judging unit has: a first judgment unit operable to judge whether or not data held in an entry of a way to which the judging unit belongs is valid, the entry being one of the entries that belong to the set selected based on the address outputted from the processor; a second judgment unit operable to judge, when a cache miss occurs, whether or not all of the following attributes match: the data attribute outputted from the processor; the data attribute of the entry; and the priority attribute of the way; and a third judgment unit operable to judge whether or not the data held in an entry of a way other than the way to which the judging unit belongs is valid, the entry being one of the entries that belong to the selected set, in the case where (i) the first judgment unit judges that the data held in the entry of the way to which the judging unit belongs is valid, (ii) the second judgment unit judges that all the attributes match, and (iii) the third judgment unit judges that the data held in the entry of the way other than the way to which the judging unit belongs is invalid, the judging unit is operable to output a request signal to a judging unit which belongs to the way that includes the entry holding data judged as invalid by a third judgment unit, and in the case where a request signal is inputted from another judging unit that belongs to a different way, the control unit is operable to store data into the entry holding data that is judged as invalid by the third judgment unit.

A system according to the present invention includes: a first processor; a first primary cache memory used by the first processor; a second processor; a second primary cache memory used by the second processor; and a secondary cache memory used by the first and second processors, wherein the respective first and second primary cache memories and the secondary cache memory is the cache memory described above. The first holding unit in the secondary cache memory may hold a processor number as a priority attribute.

With the above structure, it is possible to realize, in a hierarchical manner, a cache memory according to the present invention that improves efficiency without that one processing affects another processing in the case where different processing is executed at the same time.

A method of storing data according to the present invention is a method of storing data used by a cache memory having a set associative scheme, and includes: a plurality of ways, each way being made up of entries, each entry holding data and a tag; a first holding unit which holds, for each way, a priority attribute that indicates a type of data to be preferentially stored in that way; a second holding unit which is included at least in a first way among the ways, and is operable to hold, for each entry of the first way, a data attribute that indicates a type of data held in that entry; and a control unit that performs replace control on the entries by prioritizing a way whose priority attribute held by the first holding unit matches a data attribute outputted from a processor, and the method comprises: selecting a set of entries astride the ways, based on an address outputted from a processor, when a cache miss occurs; firstly judging whether or not data held in an entry of a first way is valid, the entry being one of entries that belong to the selected set; secondly judging whether or not all of the following attributes match: the data attribute of the entry; the data attribute outputted from the processor; and the priority attribute of the first way; thirdly judging whether or not data held in an entry of a way other than the first way is valid, the entry being one of the entries that belong to the selected set; and storing data into an entry of a way other than the first way, the entry being one of the entries that belong to the selected set, in the case where (i) it is judged, in the first judgment, that the data held in the entry of the first way is valid, (ii) it is judged, in the second judgment, that all the attributes match, and (iii) it is judged, in the third judgment, that the data held in the entry of the way other than the first way is invalid.

With the above structure, an effective use of a cache memory can be realized since a way is allocated to data that has a priority attribute, and also, data that has a different attribute is stored into a vacant entry in a way.

The data attributes may include a first data attribute that is not used as the priority attribute, and the method may further include storing data into an entry that does not hold valid data, in the case where (i) a data attribute of data to which a cache miss occurs matches the first data attribute, and (ii) the entries that belong to the set selected in the selecting include the entry that does not hold valid data.

The data attributes may include a second data attribute for allowing a plural types of data to be shared by a single way, and the method may further include rewriting, when a process is killed in the processor, a priority attribute into the second data attribute, the priority attribute indicating a type of data relating to the process and being one of the priority attributes held by the first holding unit.

The method may further include rewriting, when a process is generated in the processor, a priority attribute that indicates the second data attribute and that is one of the priority attributes held by the first holding unit, into a priority attribute that indicates a type of data relating to the process.

With the above structure, rewriting of a priority attribute according to the circumstances further promotes effective use of a cache memory, and heightens a hit rate of the cache memory.

The cache memory is an instruction cache, and the method may further include invalidating, when a process is killed in the processor, data of all the entries of a way whose priority attribute matches an attribute of data handled in the process.

The above structure allows a further pursuit of effective use of a cache memory.

As described above, an effective use of a cache memory can be realized since a way is allocated to data that has a priority attribute, and also, data that has a different attribute is stored into a vacant entry in a way. For example, in the case of storing different types of data, the efficiency can be improved without that one data processing affects another data processing.

The use of process IDs as data attributes can simplify a configuration of the system.

By using an upper bit address as a data attribute, it is easy to realize the system according to the present invention even in the system that does not use process IDs.

By using processor numbers as data attributes, it is easy to apply the present invention to a multi processor system.

Data can be stored into a cache memory based on a priority attribute, and a cache memory hit rate can be made higher by effectively using a vacant area in the cache memory, even in the case where the number of ways is greater than the number of data attributes.

The rewriting of a priority attribute enables an effective use of a cache memory as well as an increase in hit rate of the cache memory.

FURTHER INFORMATION ABOUT TECHNICAL BACKGROUND TO THIS APPLICATION

The disclosure of Japanese Patent Application No. 2004-161830 filed on May 31, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate specific embodiments of the invention. In the Drawings:

FIG. 13 shows how the system according to the first embodiment operates;

FIG. 24 shows how the system according to the fourth embodiment operates;

DESCRIPTION OF THE PREFERRED EMBODIMENTS

First Embodiment

Figure 1:
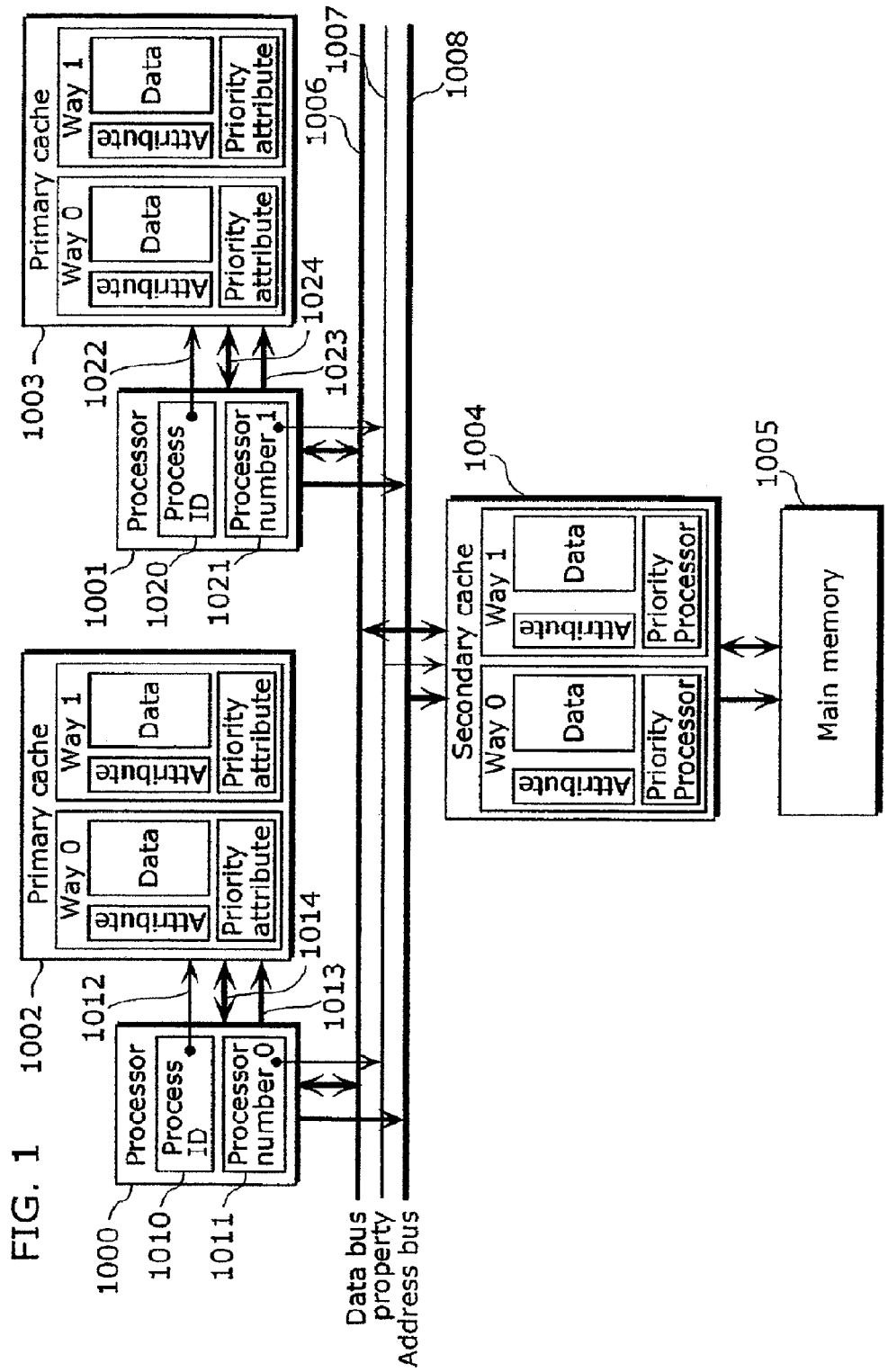
FIG. 1 is a block diagram showing a configuration of a system according to a first embodiment of the present invention.

FIG. 1 is a block diagram showing a system that includes a cache memory, according to the first embodiment of the present invention. The system includes: two processors 1000 and 1001; two primary cache memories 1002 and 1003; a secondary cache memory 1004; a main memory 1005; a data bus 1006; a property bus 1007; and an address bus 1008. Such system has memories whose structure is hierarchical. Each of the processors 1000 and 1001 executes plural processing.

The processor 1000 includes a process ID holding unit 1010 and a processor number holding unit 1011. The processor 1000 and the primary cache memory 1002 are connected via an internal data bus 1014 and an internal address bus 1013.

The process ID holding unit 1010 holds a process ID for indicating the process that is being executed. The process ID is inputted, as a process ID signal 1012 together with an address, into the primary cache memory 1002.

The processor number holding unit 1011 holds a processor number (e.g. a value "0") for identifying the processor 1000. The processor number is inputted, as a processor number signal together with an address, via the property bus 1007.

The processor 1001 has the same units as included in the processor 1000, however, a value "1" is assigned to the processor 1001 as a processor number.

The primary cache memories 1002 and 1003, and the secondary cache memory 1004 respectively holds priority attributes for each way, and stores, in the way, data whose data attribute matches the priority attribute. In the case where the way whose priority attribute matches the data attribute of the data does not have a vacant entry, and where the way of the same set, which has a priority attribute different from the data attribute, has a vacant entry, the cache memories 1002, 1003, and 1004 respectively stores data in the vacant entry. Here, a priority attribute and a data attribute are specified based on, for example, a type of data or processing (e.g. moving picture, audio, communication, still picture, text), a processor ID, a process ID, or the like.

In the present embodiment, it is assumed that in the primary cache memories 1002 and 1003, a priority attribute of Way 0 is set to "0" that indicates moving picture data while a priority attribute of Way 1 is set to "1" that indicates audio data. Each of the processors 1000 and 1001 outputs a process ID as a data attribute, to the primary cache memories 1002 and 1003. The process ID with a value "0" indicates a process for moving picture processing while the process ID with a value "1" indicates a process for audio processing.

In the secondary cache memory 1004, a priority attribute of the Way 0 is set to "0" that is a processor number of the processor 1000, while a priority attribute of the Way 1 is set to "1" that is a processor number of the processor 1001. Each of the processors 1000 and 1001 outputs a processor number as a data attribute, to the secondary cache memory 1004.

Figure 2:
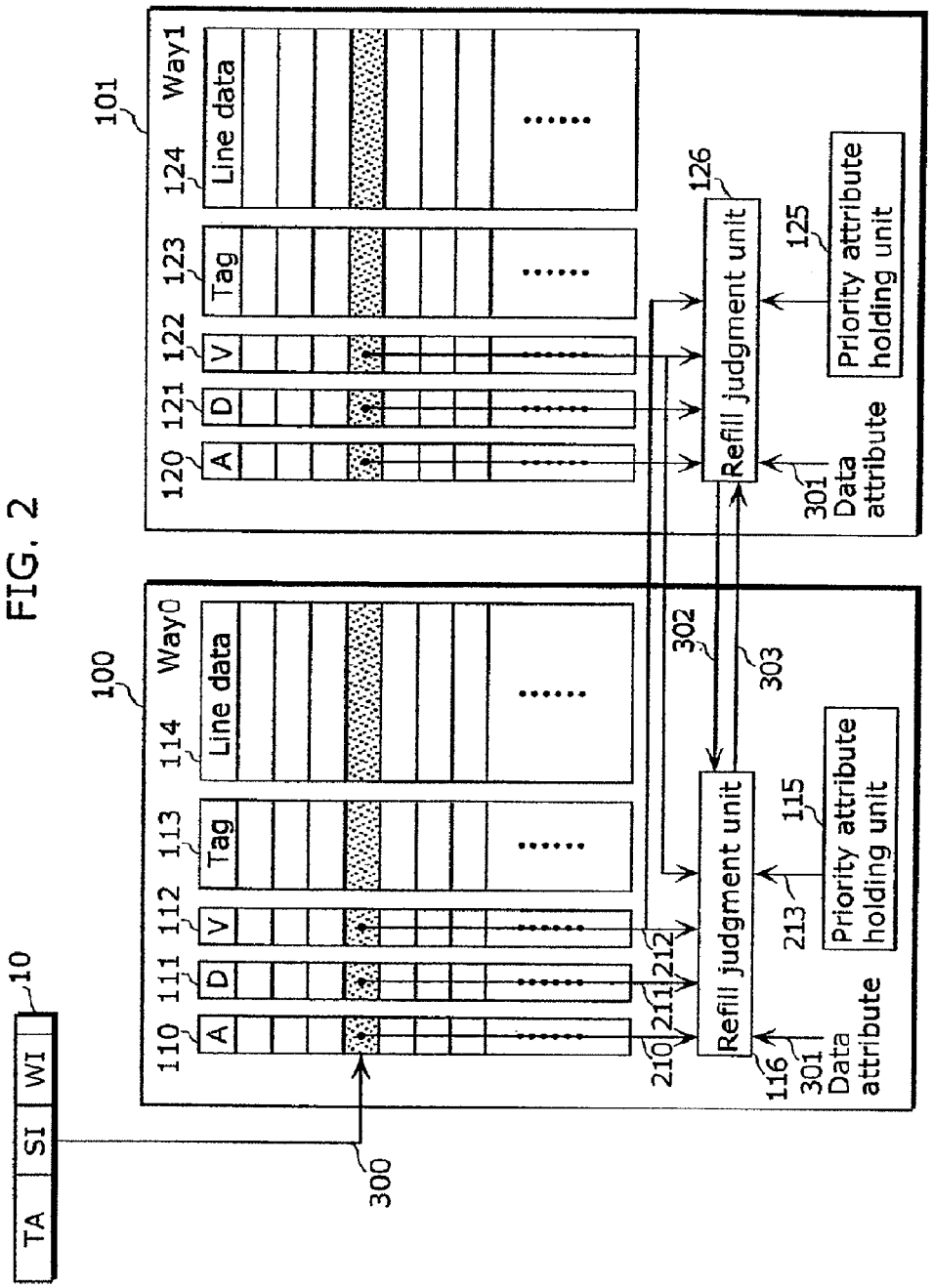
FIG. 2 is a block diagram showing a structure of a cache memory.

FIG. 2 is a block diagram showing a structure of a cache memory. The cache memory is a representative example of the structure of the respective cache memories 1002, 1003 and 1004. As shown in the diagram, the cache memory applies a set associative scheme, and includes an address register 10, two ways 100 and 101 (also referred to as "Way 0" and "Way 1").

The address register 10 is a register for holding a memory access address or a command fetch address that are sent from the processor. As shown in the diagram, a memory access address includes the following sequentially starting from upper bits: a tag address TA; a set index SI; and a word index WI. For example, it is assumed that 32 bits is assigned for the address which includes 21 bits for the tag address (A31-A11), 4 bits for the set index (A10-A7), 5 bits for the word index (A6-A2).

Here, a block in the memory, which is specified by the tag address TA and the set index SI, is a unit of refill. In the case where the block is stored in the cache memory, it is called "line data" or "line". The size of the line data is determined based on an amount of the bits assigned for the address lower than the set index. In the case where 7 bits (A6-A0) are assigned for the address that is lower than the set index, the size of the line data is 128 bits. Assuming that 4 bytes are assigned for one word, one line data contains 32 words.

The set index SI indicates one of the sets (e.g. a part that is half-tone dotted in FIG. 2) that consists of two entries specified in each of the ways. The number of sets is 16 sets in the case where 4 bits are assigned for a set index SI.

The tag address TA indicates an area (its size is defined by number of sets x size of block) in the memory that can be mapped by a single way. The size of the area is a size of a single way and is determined based on an amount of bits for the address lower than the tag address. In the case where 11 bits (A10~A0) are assigned for the address that is lower than the tag address, the size of a single way is 2 kilobytes.

The word index WI indicates one word among plural words that constitute line data. Note that the lowest 2 bits (A1 and A0) in the address register 10 is ignored at the time of word access.

Way 0 is made up of plural entries. Such Way 0 includes: a data unit 114 that stores data; a tag unit 113 that stores a tag address of an address of the data stored in the data unit 114, as a tag; a data attribute storing unit 110 which stores data attributes; a dirty bit storing unit 111 that indicates that data in a cache memory is rewritten; a valid bit storing unit 112 that indicates that valid data is stored in the data unit 114; a priority attribute holding unit 115 which holds a priority attribute that indicates the data attribute to be preferentially stored into the Way 0; and a refill judgment unit 116 that judges whether or not the entry in the Way 0 should be refilled with data.

Similarly, the Way 1 includes: a data unit 124 that stores data; a tag unit 123 that stores a tag address of an address of the data stored in the data unit 124; a data attribute storing unit 120 that stores data attributes; a dirty bit storing unit 121 that indicates that data in a cache memory is rewritten; a valid bit storing unit 122 which indicates that valid data is stored in the data unit 124; a priority attribute holding unit 125 which holds a priority attribute that indicates the data attribute to be preferentially stored in the Way 1; and a refill judgment unit 126.

The half-tone dotted part in the diagram indicates two entries within the set selected based on the set index 300, and values of the entries are inputted as data attribute signals 210 and 220, dirty bit signals 211 and 221, valid bit signals 212 and 222, into the refill judgment units 116 and 126. The data attribute 301 is outputted when the processors 1000 and 1001 access to data. The data storage request signal 303 is a signal used by the refill judgment unit 116 in order to request the refill judgment unit 126 to store data into the data unit 124. The data storage request signal 302 is a signal used by the refill judgment 126 in order to request the refill judgment unit 116 to store data into the data unit 114.

Figure 3:
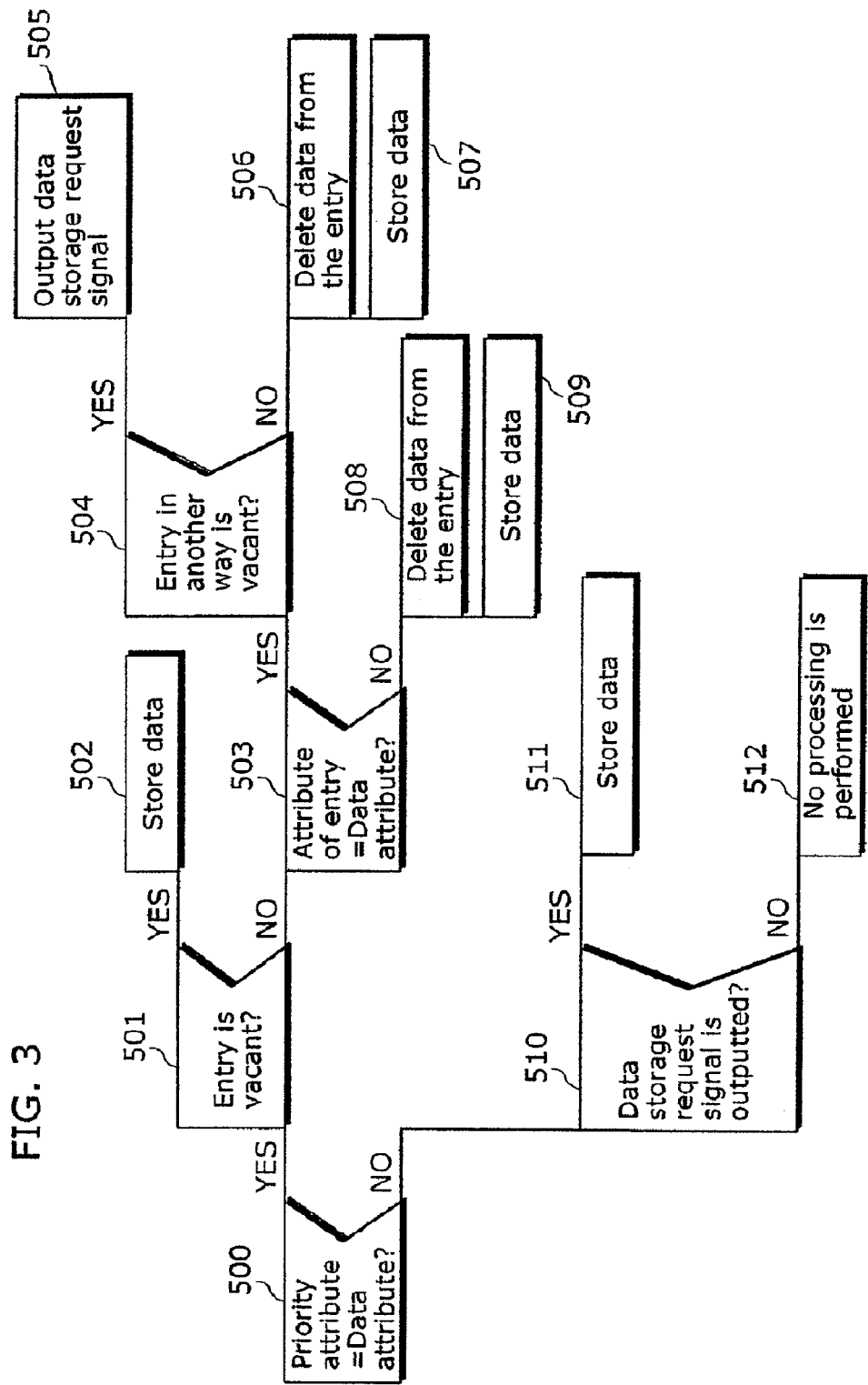
FIG. 3 is a flowchart showing a method of storing data when a cache miss occurs.

FIG. 3 is a flowchart showing a data storage method according to the present invention in the case where a cache miss occurs, and shows a control flow of the respective refill judgment units 116 and 126. The flow controlled by the refill judgment unit 126 is indicated in brackets.

In Step 500, the refill judgment unit 116 (126) compares a value indicated by the priority attribute unit 115 (125) and the data attribute 301, and proceeds to Step 501 in the case where they match as a result of the comparison, but proceeds to Step 510 in the case where they do not match.

In Step 501, the refill judgment unit 116 (126) judges whether or not the value of the valid bit signal 212 (222), that is, a value indicated by the valid bit storing unit of the entry selected based on the set index 300, indicates that data stored in the data unit 114 is valid, and proceeds to Step 502 in the case where the value indicates that the data is invalid, namely, the entry is vacant, but proceeds to Step 503 in the case where the data is valid, namely, the entry is not vacant.

In Step 502, the refill judgment unit 116 (126) stores data into the data unit 114 (124).

In Step 503, the refill judgment unit 116 (126) judges whether or not a value of the data attribute signal 210 (220), that is, a value indicated by the data attribute storing unit of the entry selected based on the set index 300 is as same as the value of the data attribute 301, and proceeds to Step 504 in the case where they are same, but proceeds to Step 508 in the case where they are not same.

In Step 504, the refill judgment unit 116 (126) judges whether or not the valid bit signal 222 (212) of the other Way indicates that data stored in the data unit 114 is invalid (i.e. the entry is vacant), and proceeds to Step 505 in the case where the signal indicates that the data is invalid, but proceeds to Step 506 in the case the signal indicates that the data is valid.

In Step 505, the refill judgment unit 116 (126) outputs a data storage request signal 303 (302).

In Step 506, the refill judgment unit 116 (126) clears the data, which is stored in the data unit 114 of the entry selected based on the set index 300 of the Way to which the refill judgment unit 116 (126) belongs, out from the cache memory.

That is to say, the refill judgment unit 116 (126) writes back the data into the main memory 1005 in the case where the data is dirty.

In Step 507, the refill judgment unit 116 (126) stores the data (i.e. the data to which cache memory miss has occurred) accessed by the processors 1000 and 1001, into the data unit 114 of the entry selected based on the set index 300.

In Step 508, the refill judgment unit 116 (126) clears the data, which is stored in the data unit 114 (124) of the entry selected based on the set index 300 of the Way to which the refill judgment unit 116 (126) belongs, out from the cache memory.

In Step 509, the refill judgment unit 116 (126) stores the data (i.e. the data to which cache memory miss has occurred) accessed by the processors 1000 and 1001, into the data unit 114 (124) of the entry selected based on the set index 300.

In Step 510, the refill judgment unit 116 (126) judges whether or not a data storage request signal 302 (303) is outputted, and proceeds to Step 511 in the case where the signal is outputted, but proceeds to Step 512 in the case where the signal is not outputted.

In Step 511, the refill judgment unit 116 (126) stores the data (i.e. the data to which cache memory miss has occurred) accessed by the processors 1000 and 1001, into the data unit 114 (124) of the entry selected based on the set index 300.

Figure 4:
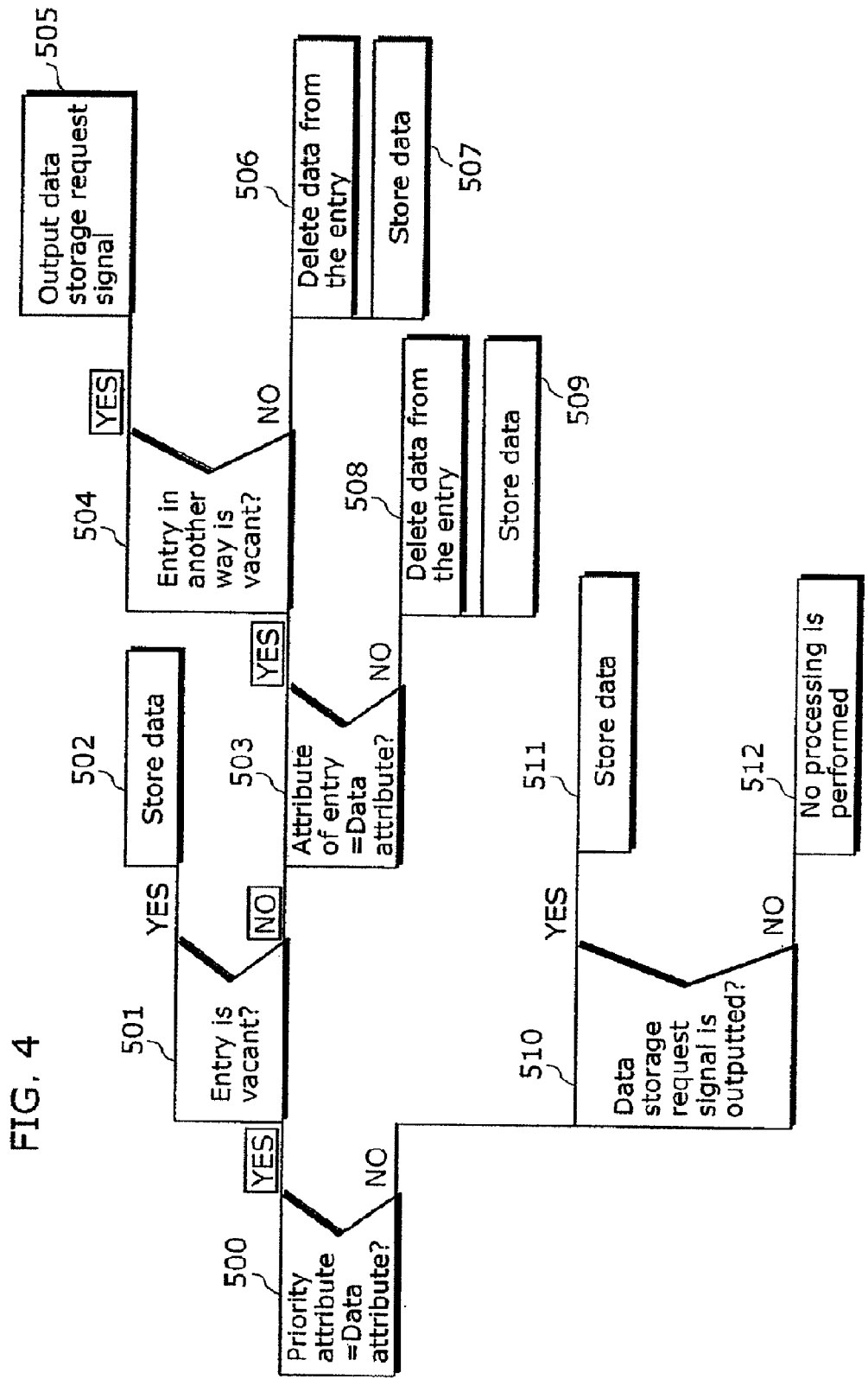
FIG. 4 is a diagram showing a method of storing data when a cache miss occurs.
Figure 5:
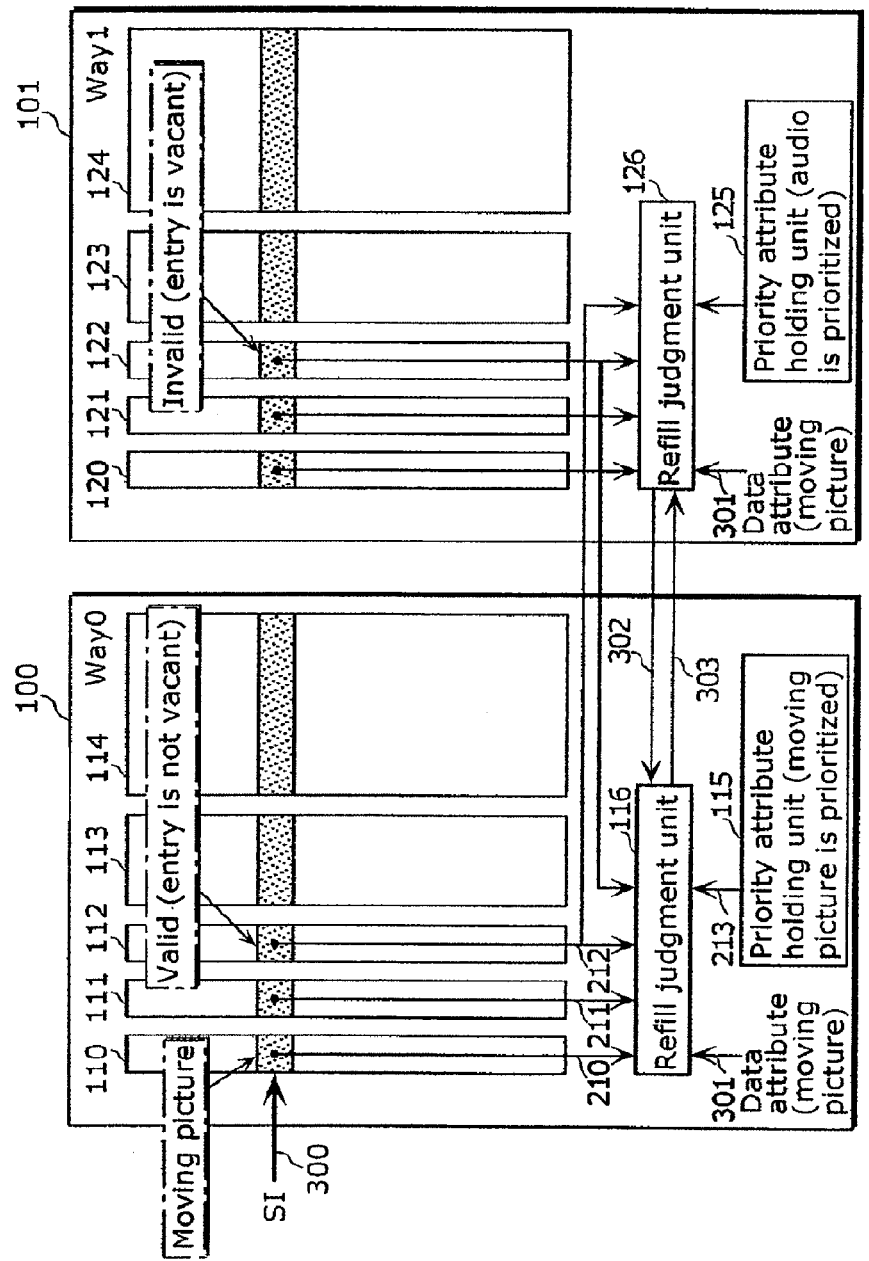
FIG. 5 is a diagram showing how each unit in the cache memory operates at the time when a cache miss occurs.
Figure 6:
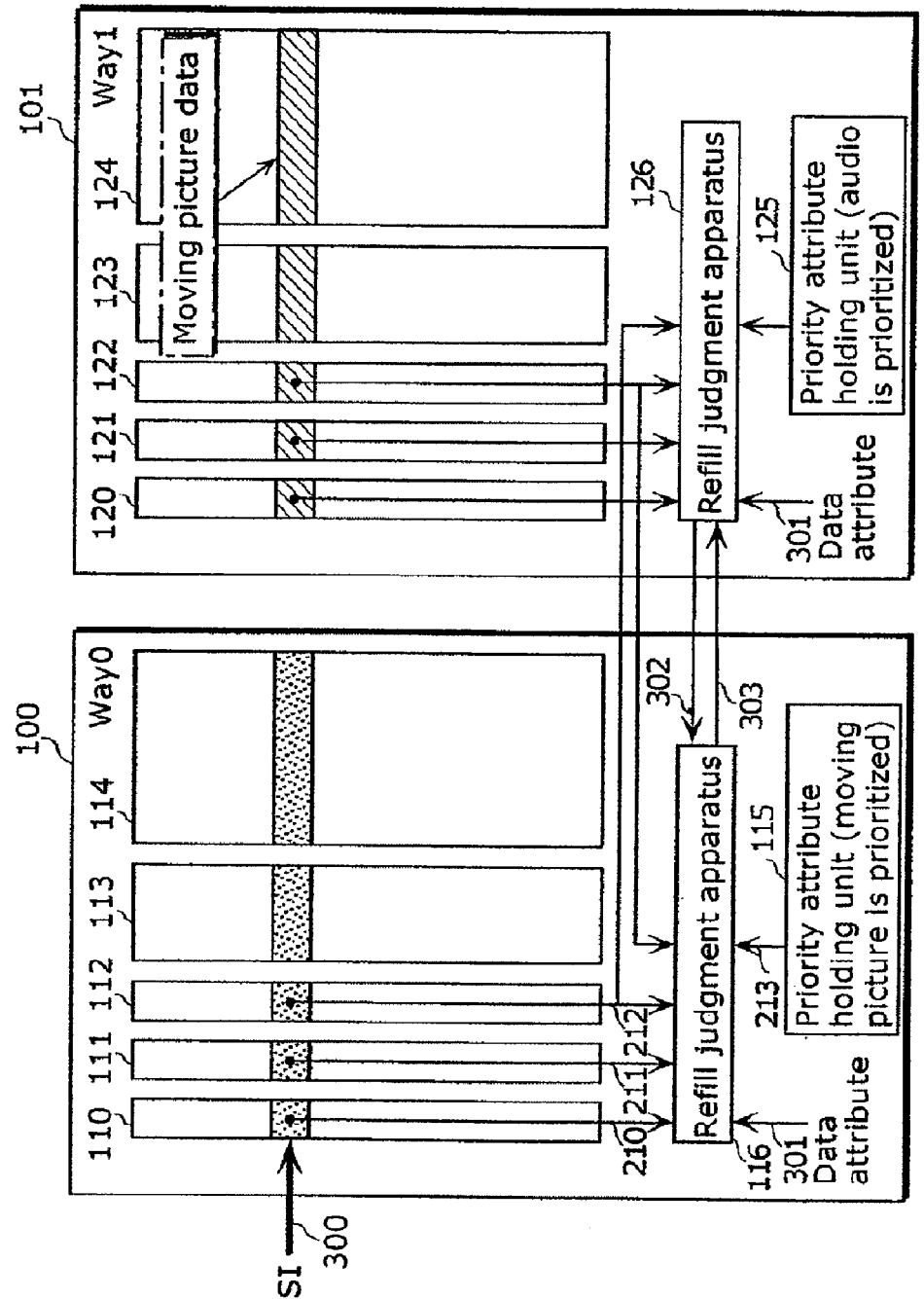
FIG. 6 is a block diagram showing a state where data is stored.

FIGS. 4 to 6 show the following case: a cache miss occurs to moving picture data in the primary cache memory 1002 or 1003; and as for the two entries of the set selected based on the set index 300, the entry of the Way 0 whose priority attribute is moving picture processing has valid moving picture data, while the entry of the Way 1 whose priority attribute is audio processing does not have valid data. In such case, the data to which cache memory miss has occurred is stored into the entry of the Way 1.

FIG. 4 shows how the refill judgment unit 116 controls storage of data in such case, and the processing emphasized in bold is executed by the refill judgment unit 116.

FIG. 5 shows each unit in the cache memory operates at the moment when a cache miss occurs, whereas FIG. 6 shows the state after the data to which cache memory miss has occurred is stored.

Here, the Way 1 normally stores audio data into the data unit 124 since a value of the priority attribute holding unit 125 indicates audio processing, however, moving picture data to which a cache miss has occurred is stored into the entry of the Way 1 because the entry selected based on the set index 300 happens to be vacant. Hereinafter, "the Way 1 has a vacancy" means that "data has not been stored into the selected entry in the Way 1".

The following describes behaviors of the cache memory as described above as the operation of the whole system shown in FIG. 1. Here, in spite that four types, namely, moving picture, audio, common (communication and still picture), and others (e.g. a text display), are provided as data attributes, and five types of processing is provided for only two ways, it becomes apparent that a cache memory is effectively used by dynamically rewriting these attributes.

FIGS. 7 to 15 show the operation of the system shown in FIG. 1. In each of the diagrams, a data attribute definition 1 indicates patterns for differentiating the data attributes stored in the secondary cache memory 1004 while a data attribute definition 2 indicates patterns for differentiating the data attributes stored in the primary cache memories 1002 and 1003.

Firstly, in the primary cache memory, "moving picture" is held in the priority attribute holding unit of the Way 0 while "audio" is held by the priority attribute holding unit of the Way 1. In the secondary cache memory, the processor number "0" is held by the priority attribute holding unit of the Way 0 while the processor number "1" is held by the priority attribute holding unit of the Way 1.

Figure 7:
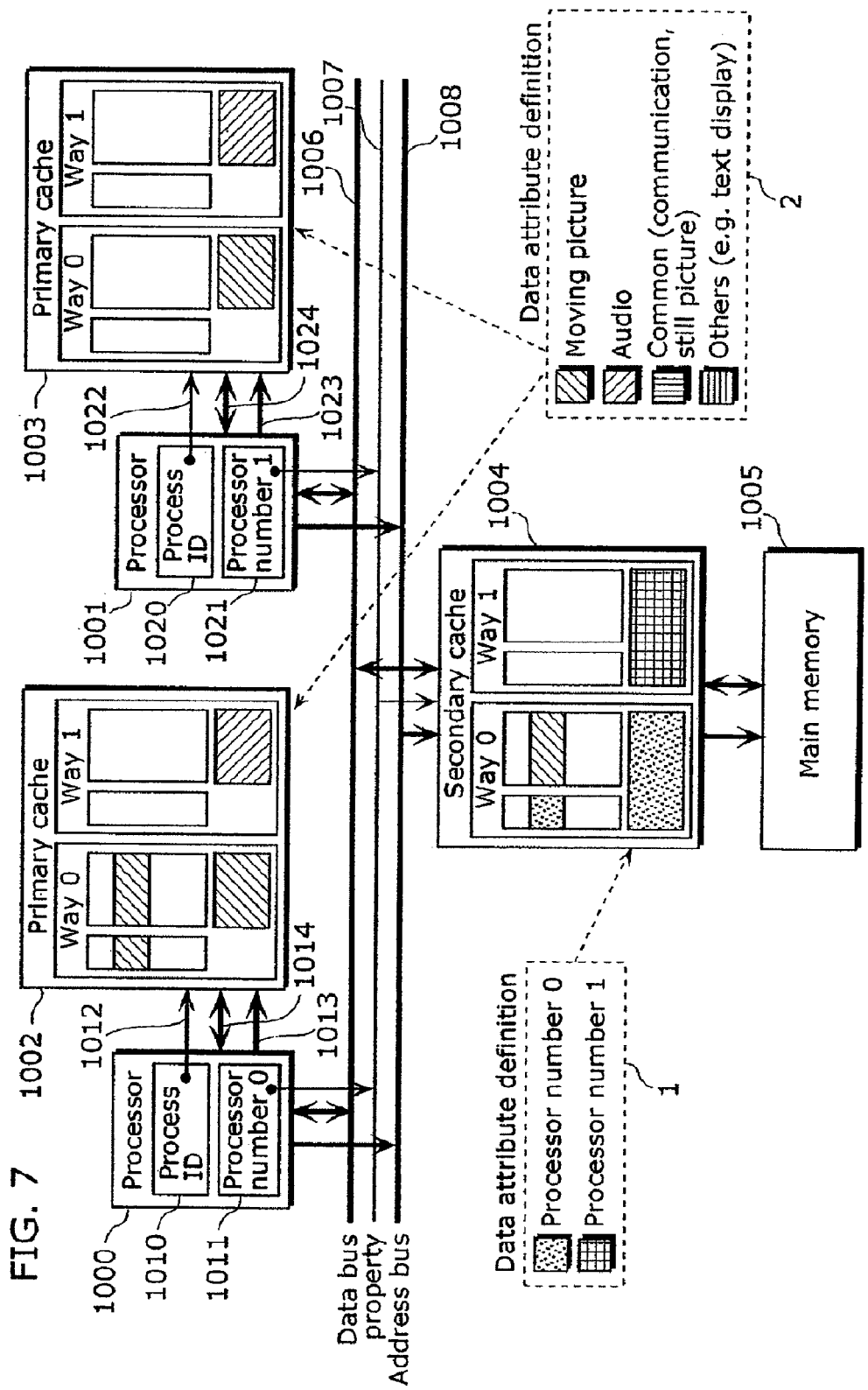
FIG. 7 shows how the system according to the second embodiment operates.
Figure 8:
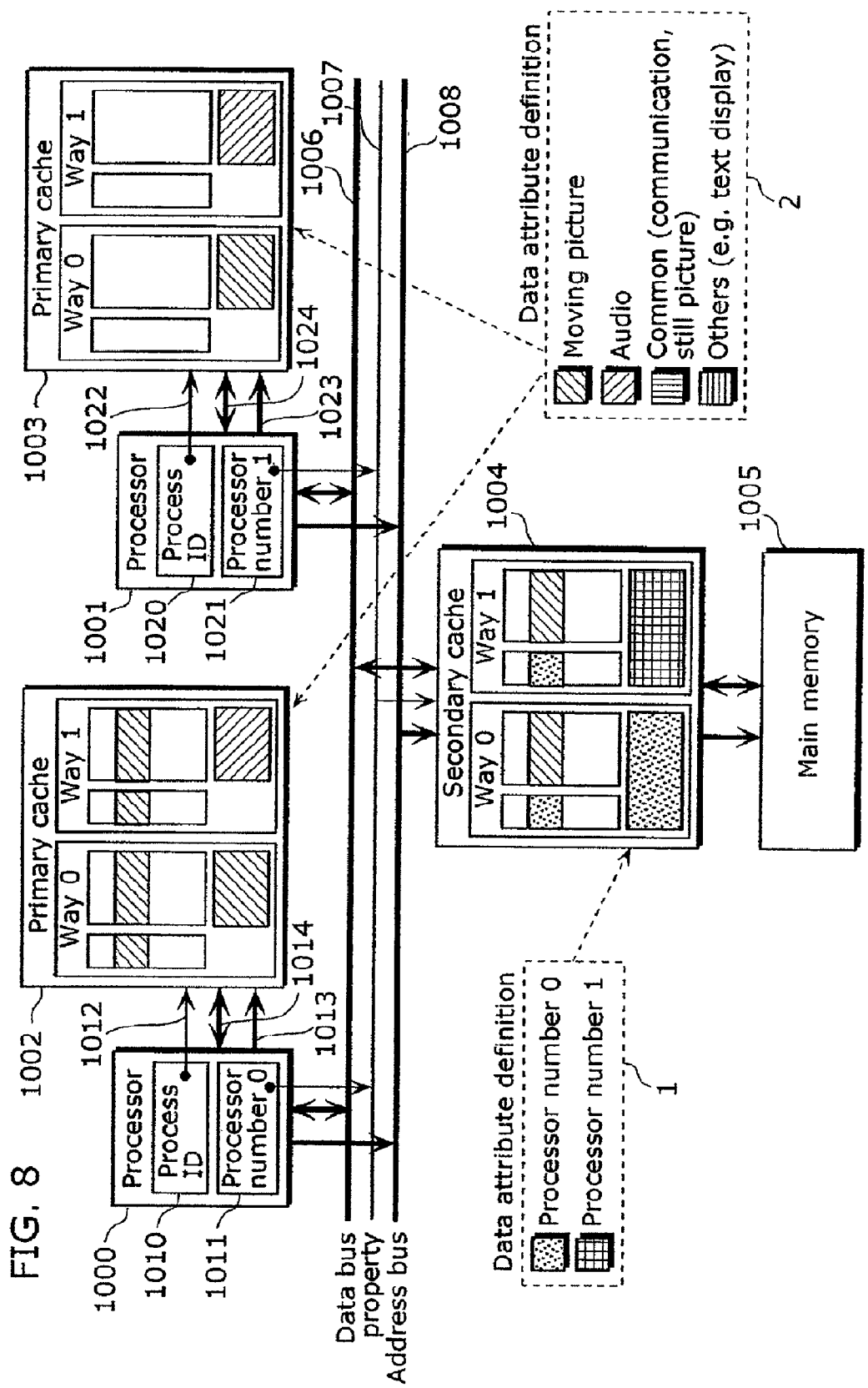
FIG. 8 shows how the system according to the first embodiment operates.

As shown in FIG. 7, the processor 1000 performs processing for moving pictures, and stores data into the primary cache memory and the secondary cache memory. Then, the method of storing data indicated as Step 502 in FIG. 3 is executed.

As shown in FIG. 8, the processor 1000 again performs processing for moving pictures, and stores data into the primary cache memory and the secondary cache memory. Then, the method of storing data indicated as Steps 505 and 511 is executed. In the primary cache memory, audio processing is prioritized in the Way 1, however, moving picture data is stored in the Way 1 as the Way 1 has a vacant entry. In the secondary cache memory, the processor 1001 is prioritized in the Way 1, however, data sent from the processor 1000 is stored in the Way 1 as it the Way 1 has a vacant entry.

Figure 9:
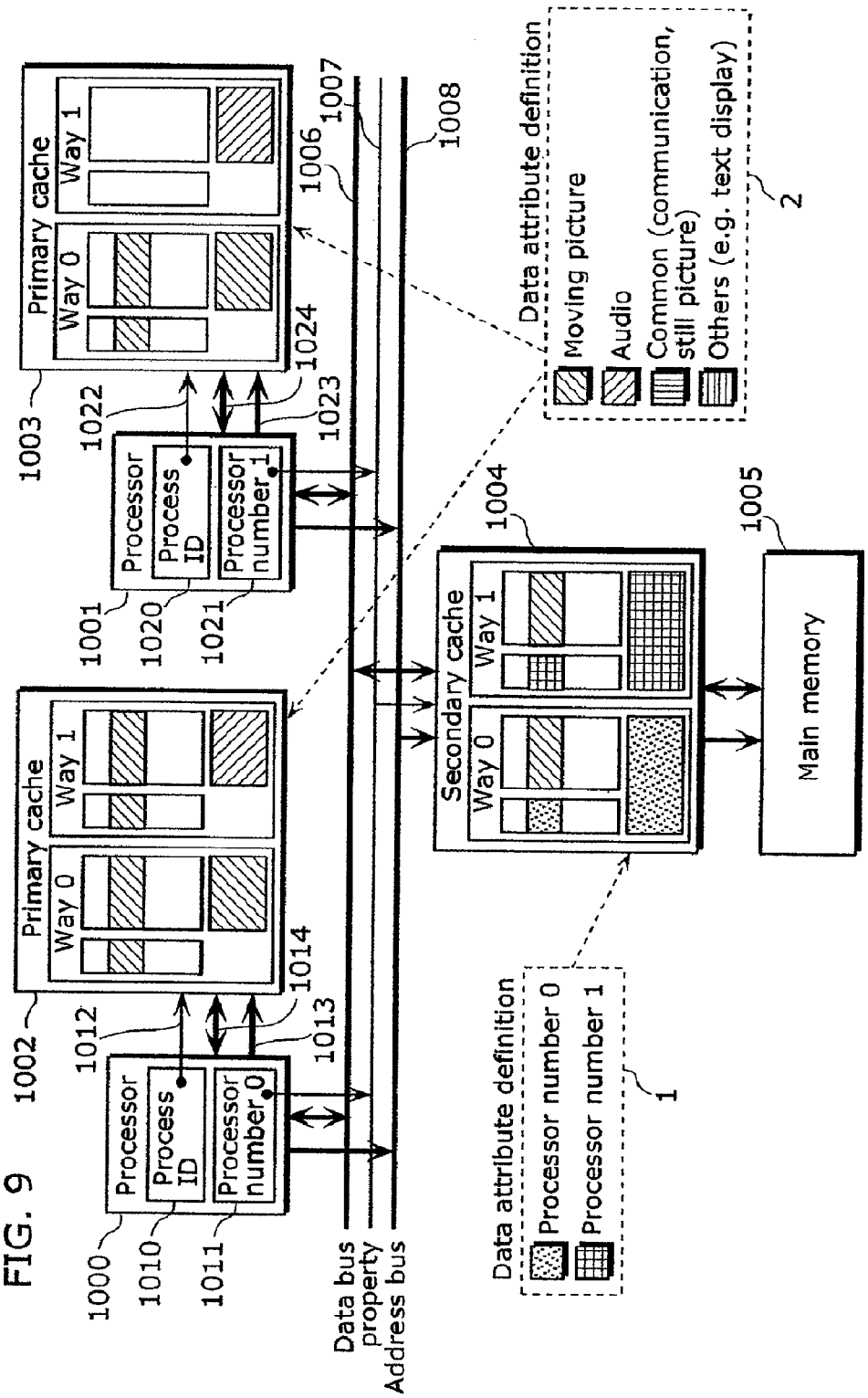
FIG. 9 shows how the system according to the first embodiment operates.

As shown in FIG. 9, the processor 1001 with a processor number "1" performs moving picture processing, and stores data into the primary cache memory and the secondary cache memory. In the primary cache memory, the method of storing data indicated in FIG. 3 is executed, while in the secondary cache memory, the method of storing data indicated as Steps 508 and 509 in FIG. 3 is executed. In the secondary cache memory, since the processor 1001 is prioritized in the Way 1, so that the data that is transmitted from the processor 1000 and has been stored in the Way 1 is cleared out.

Figure 10:
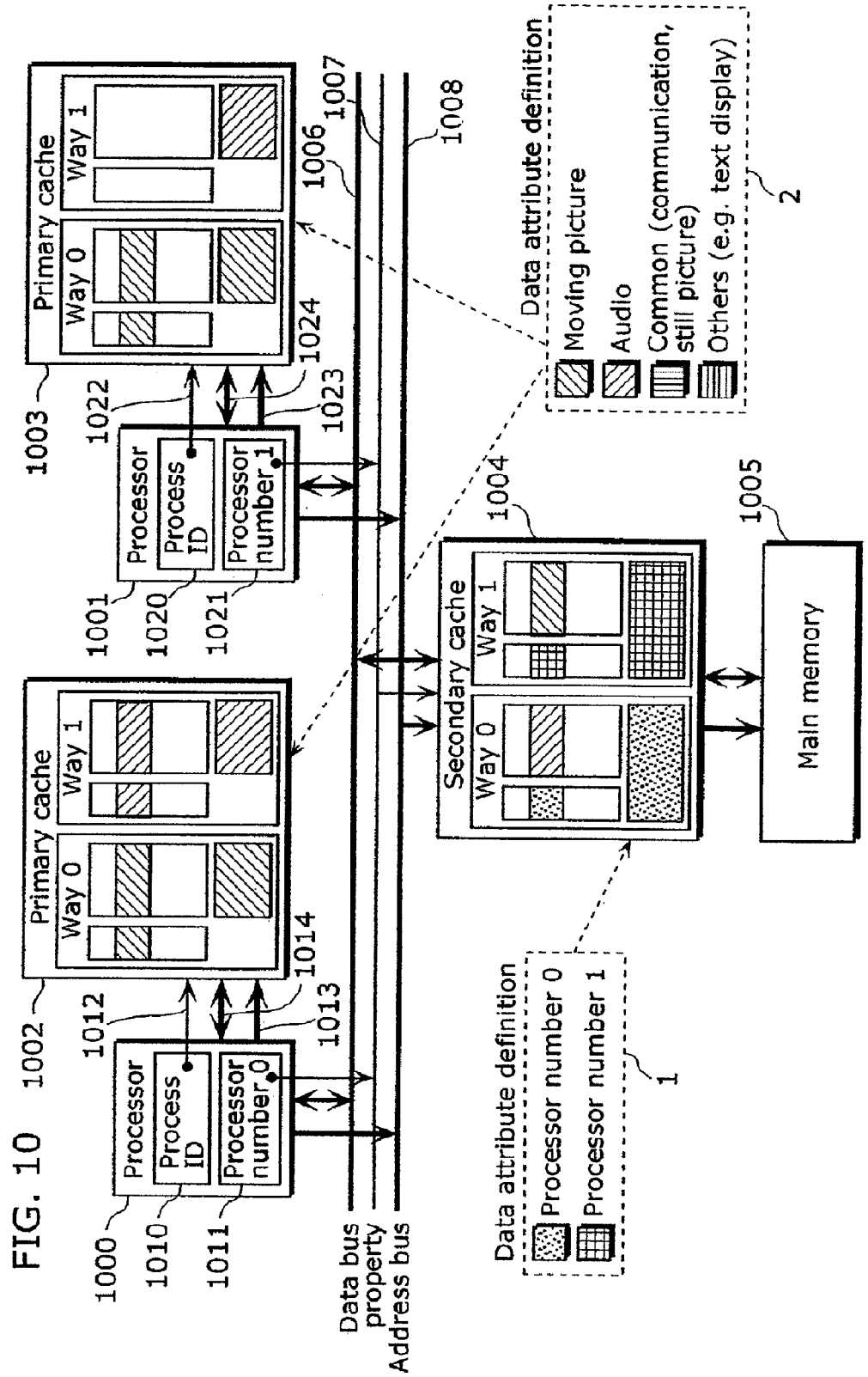
FIG. 10 shows how the system according to the first embodiment operates.

As shown in FIG. 10, the processor 1000 with a processor number "0" performs audio processing, and stores data into the primary cache memory and the secondary cache memory. In the primary cache memory, the method of storing data indicated as Steps 508 and 509 in FIG. 3 is executed. In the secondary cache memory, the method indicated as Steps 506 and 507 in FIG. 3 is executed.

Figure 11:
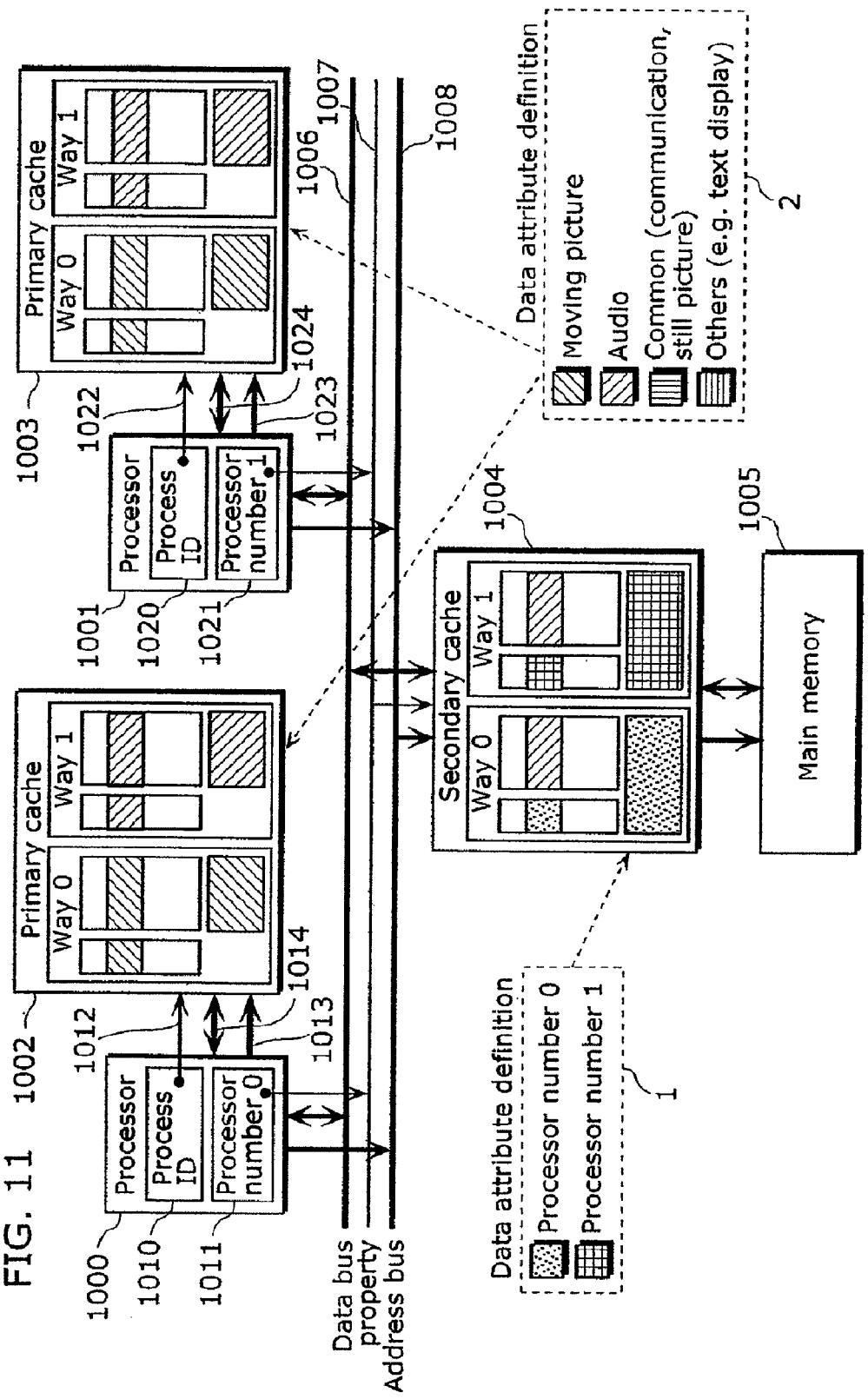
FIG. 11 shows how the system according to the first embodiment operates.

As shown in FIG. 11, the processor 1001 with a processor number "1" performs audio processing, and stores data into the primary cache memory and the secondary cache memory. In the primary cache memory, the method of storing data indicated as Step 502 in FIG. 3 is executed, while in the secondary cache memory, the method indicated as Steps 506 and 507 in FIG. 3 is executed.

Figure 12:
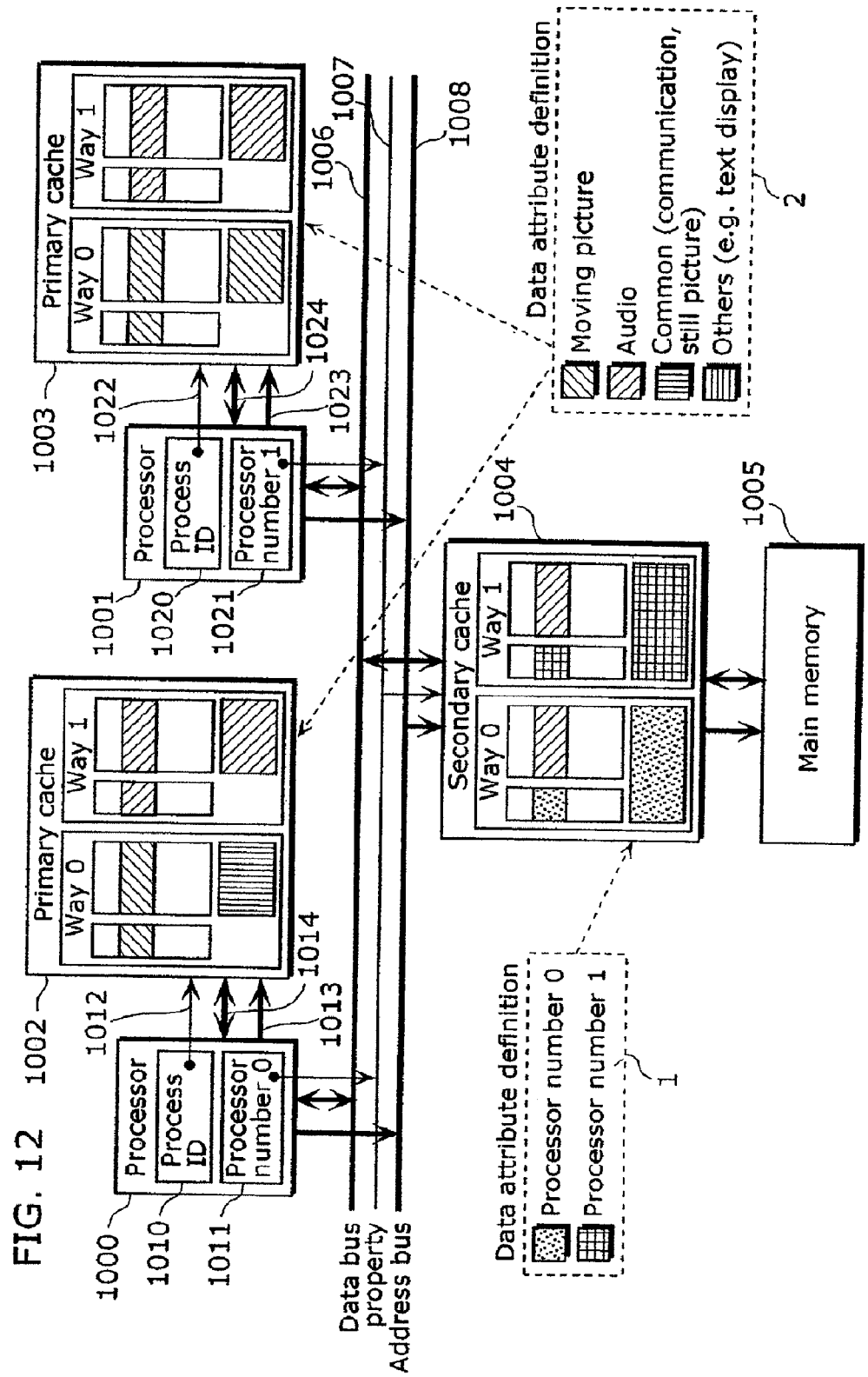
FIG. 12 shows how the system according to the first embodiment operates.
Figure 26:
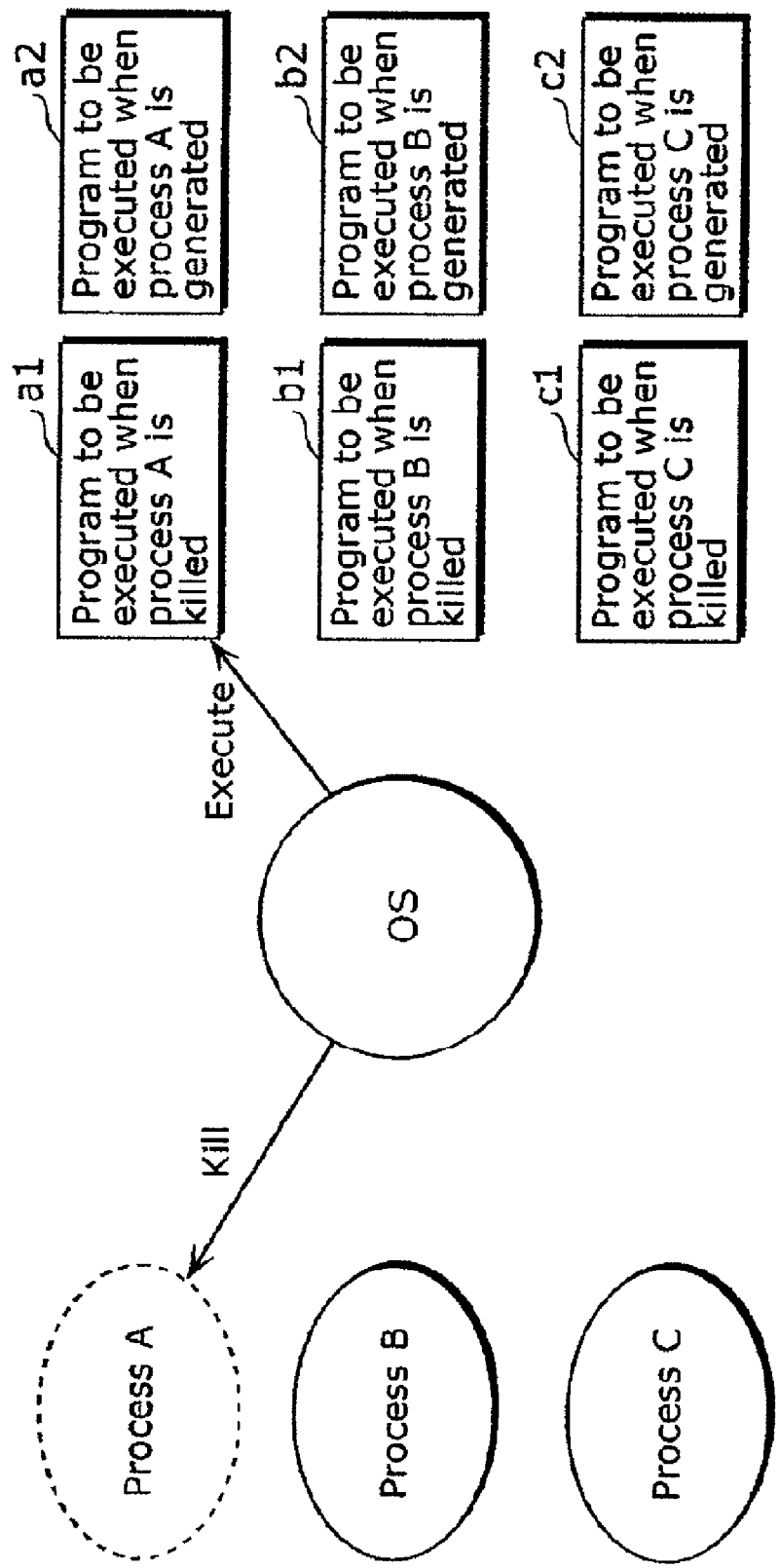
FIG. 26 is a diagram showing a mechanism at the time when a process is killed or generated.

As shown in FIG. 12, the process of moving picture processing performed by the processor 1000 with a processor number "0" is killed, and the priority attribute unit of the Way 0 is changed to be "common". FIG. 26 shows a mechanism operated by the OS for rewriting the value indicated by the priority attribute unit for killing and creating a process.

In FIG. 26, programs a1 and a2 are executed for a process A, programs b1 and b2 are executed for a process B while programs c1 and c2 are executed for a process C. The program a1 is a program that is prepared by the user, and is also a program for setting, changing or deleting the priority attribute of the way assigned to the process A, when the process A is killed. The program a2 is a program that is prepared by the user, and is also a program for setting, changing or deleting the setting of the priority attribute of the way assigned to the process A, when the process A is created. Similarly, the programs b1 and b2, and the programs c1 and c2 are respectively executed for the corresponding process B and C. The OS calls out a program when the process is killed or created. In the present diagram, the OS kills the process A and executes the program a1 so as to set the value indicated by the priority attribute unit. For example, in FIG. 12, the program a1 indicates that "the priority attribute unit of the way prioritized by the killed process should be rewritten to be "common"". The program a2 indicates that "the priority attribute unit of the way prioritized by the created process should be rewritten to be "moving picture"". Note that the user does not necessarily need to prepare both the programs a1 and a2, but one of them. The same applies to the programs b1 and b2, as well as the programs c1 and c2.

Figure 13:
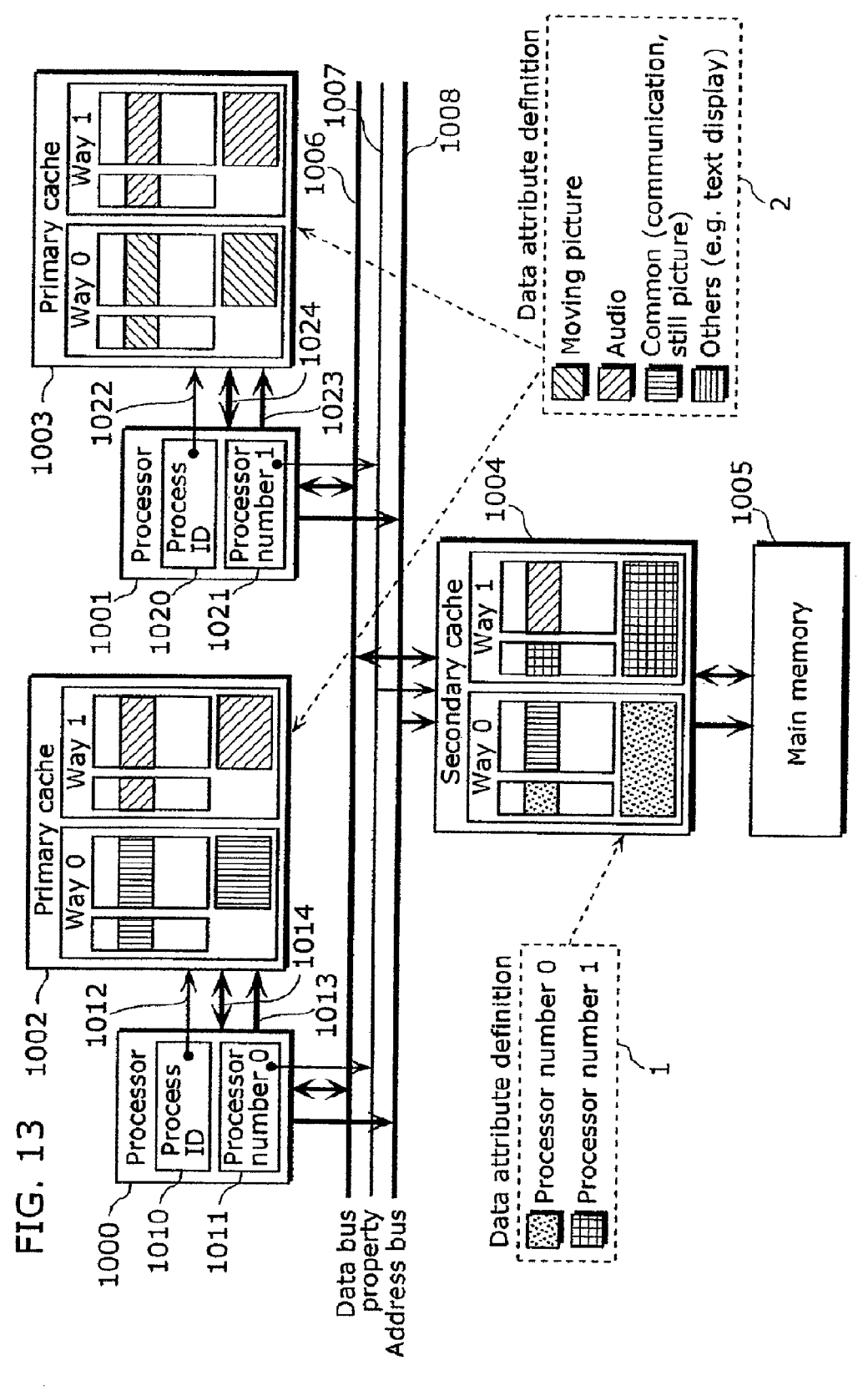

As shown in FIG. 13, the processor 1000 with a processor number "0" performs communication processing, and stores data into the primary cache memory and the secondary cache memory. In the primary cache memory, the method of storing data indicated as Steps 508 and 509 shown in FIG. 3 is executed.

Figure 14:
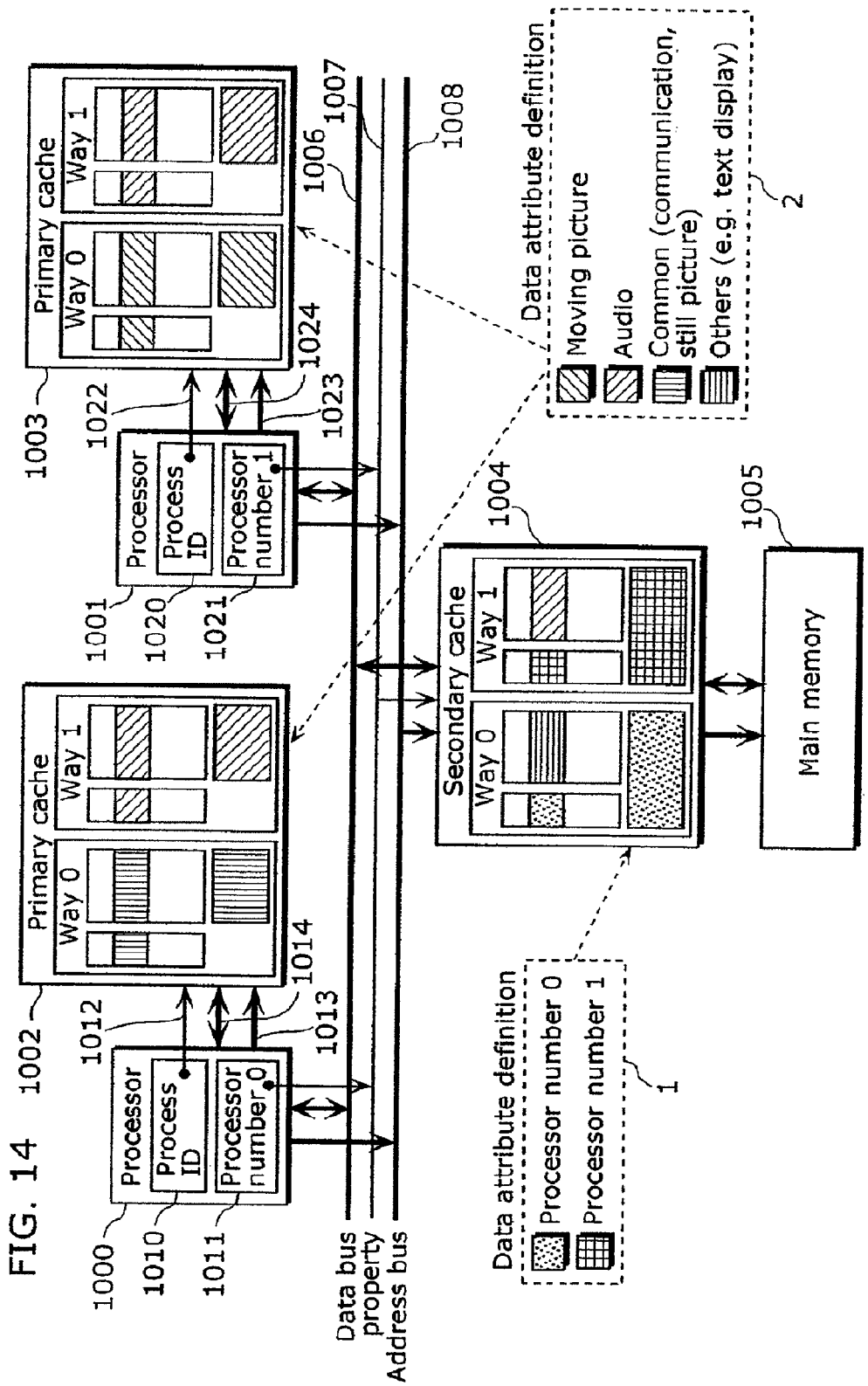
FIG. 14 shows how the system according to the first embodiment operates.
Figure 15:
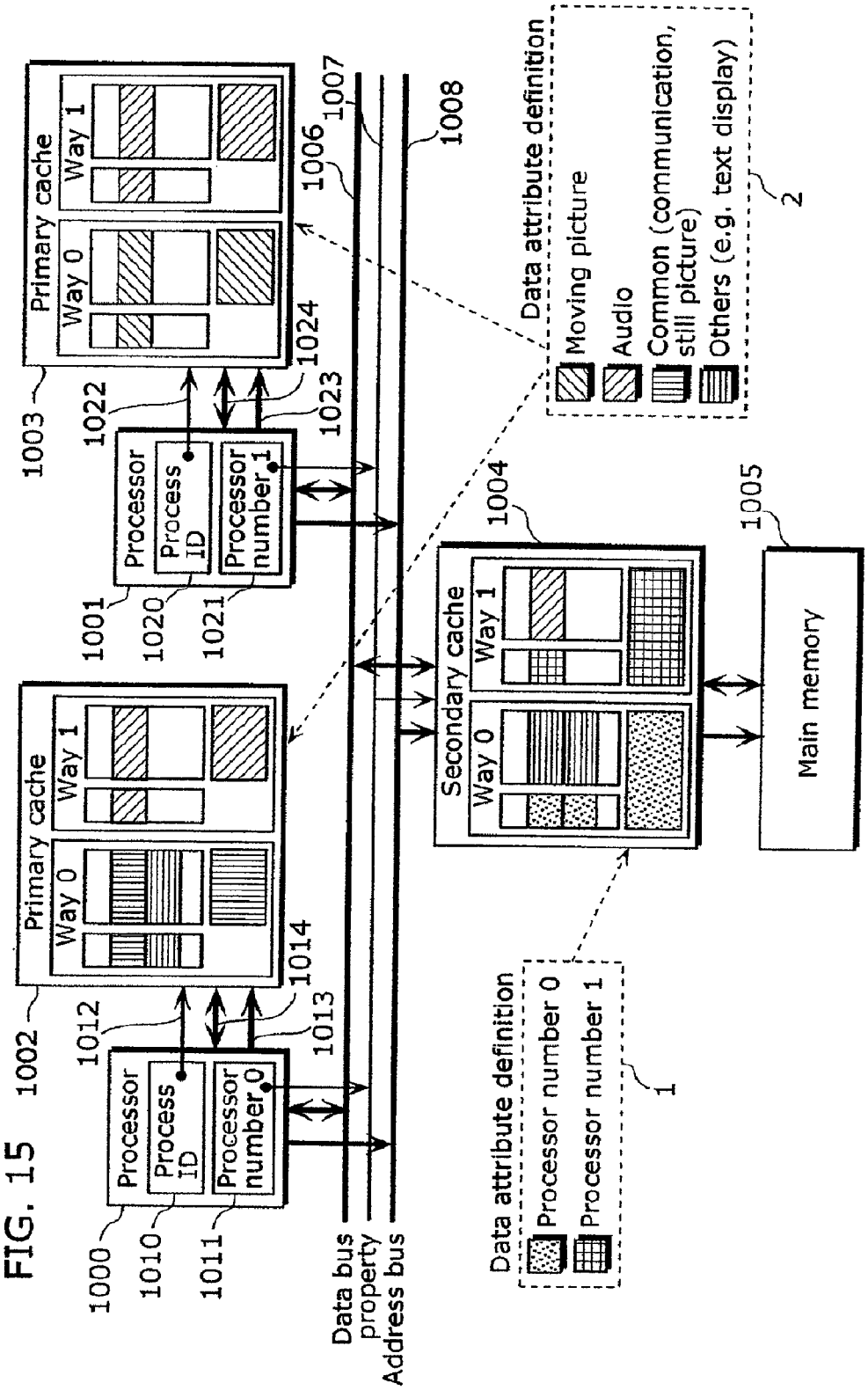
FIG. 15 shows how the system according to the first embodiment operates.

As shown in FIG. 14, the processor 1000 with a processor number "0" performs text display, and stores data into the secondary cache memory. However, data is not stored into the primary cache memory since there is no vacant entry. In the primary cache memory, the method of storing data indicated as Step 512 shown in FIG. 3 is executed, while in the secondary cache memory, the method indicated as Steps 506 and 507 in FIG. 3 is executed.

As described above, by specifying the data attribute to be prioritized for each way in the cache memory, the way is not occupied with data of different attribute, and also, data is allowed to be stored in the case where the cache memory has a way which does not hold data even though the number of data attributes is greater than the number of ways. Therefore, a vacant area can be effectively used for storing data of different attribute.

By including "common" and "others" in the data attributes it is possible to store data into the cache memory based on the priority attribute even in the case where the number of data attributes is greater than the number of ways. It is also possible to increase a cache memory hit rate by effectively using a vacant area in the cache memory.

Even though a data attribute of the data to be stored is not the data attribute specified as a priority attribute, in the case where one of the entries that belong to the set selected in the selection step has an entry that has no valid data, the data is stored in the entry. Thus, a vacant area is used effectively.

When there is no need to perform moving picture processing, the processor 1000 effectively uses the Way 0 for communication processing by rewriting the priority attribute of the Way 0 to be "common". Thus, by rewriting the priority attribute according to the circumstances, the use of the cache memory becomes further effective and a hit rate in the cache memory becomes higher.

Moreover, by using process IDs as data attributes, instead of the data attributes that are normally used, the configuration of the system can be simplified. The management of the secondary cache memory for implementing the present invention under a multi processor system can be easily carried out by generating data attributes using processor numbers.

Second Embodiment

Figure 16:
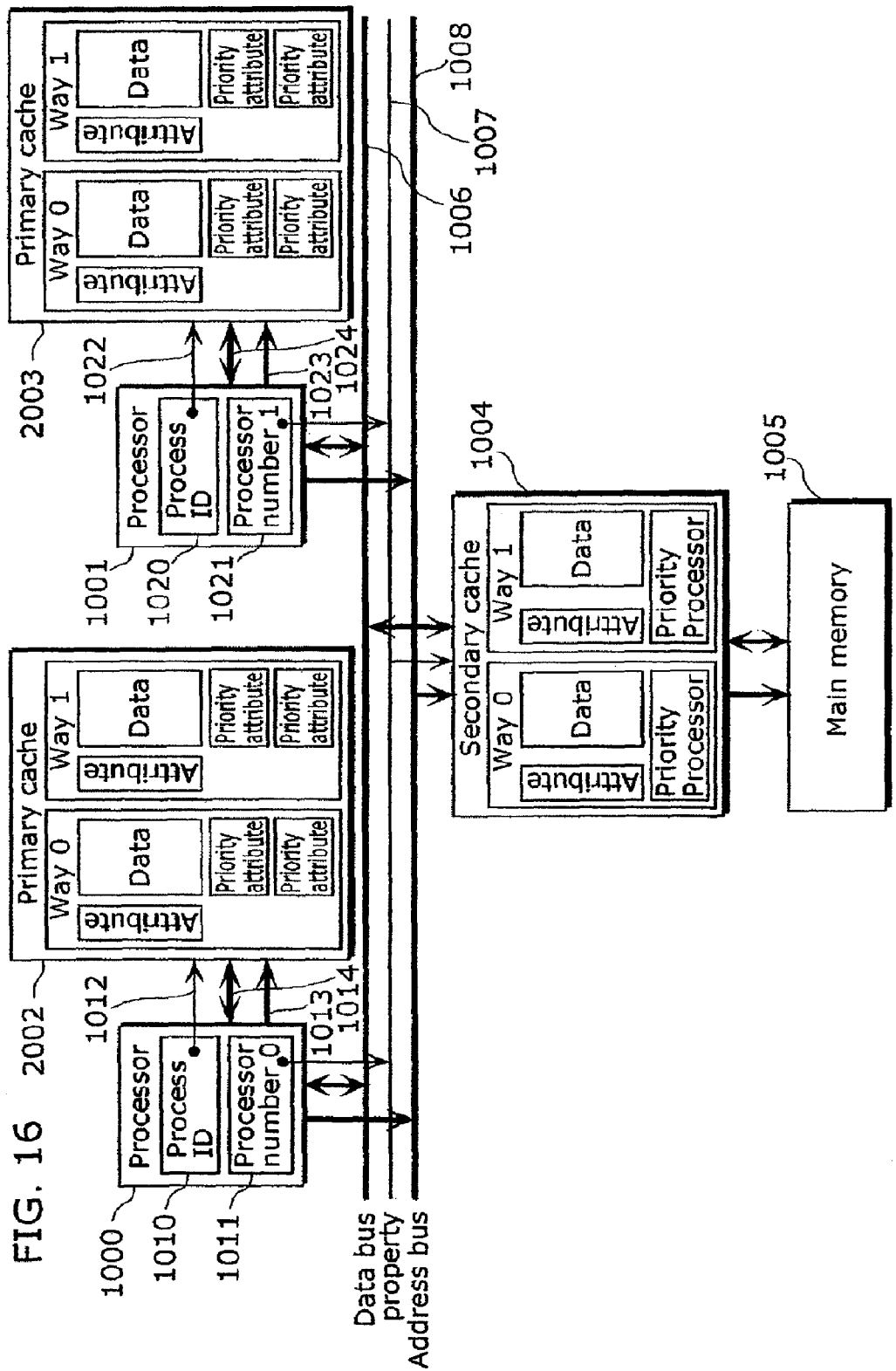
FIG. 16 shows a configuration of a system according to a second embodiment of the present invention.

FIG. 16 is a block diagram showing a configuration of the system according to the second embodiment of the present invention. The system in FIG. 16, as compared with FIG. 1, is different in that it includes primary cache memories 2002 and 2003 instead of the primary cache memories 1002 and 1003. As the same referential signs are put for the same components, the description is not repeated here, and the following description mainly focuses on the difference between the two systems.

In the primary cache memories 2002 and 2003, the priority attribute holding unit in each way holds two priority attributes, which is different from the primary cache memories shown in FIG. 1. Thus, the processing of one of the two priority attributes held by the priority attribute holding unit in each way is performed exclusively to the processing of the other priority attribute. It therefore becomes apparent that a vacant area in the cache memory can be effectively used.

FIGS. 17 to 20 show the operation of the system according to the present invention shown in FIG. 16. Here, "moving picture" and "communication" are specified as priority attributes by the priority attribute holding unit of the Way 0 in the cache memory, while "audio" and "still picture" are specified as priority attributes by the priority attribute holding unit of the Way 1. In the secondary cache memory, the processor number "0" is held by the priority attribute holding unit of the Way 0, while the processor number "1" is held by the priority attribute holding unit of the Way 1. In each of the diagrams, a third data attribute definition 3 indicates patterns for differentiating the data attributes placed in the secondary cache memory, while a fourth data attribute definition 4 indicates patterns for differentiating the data attributes placed in the primary cache memory.

Figure 17:
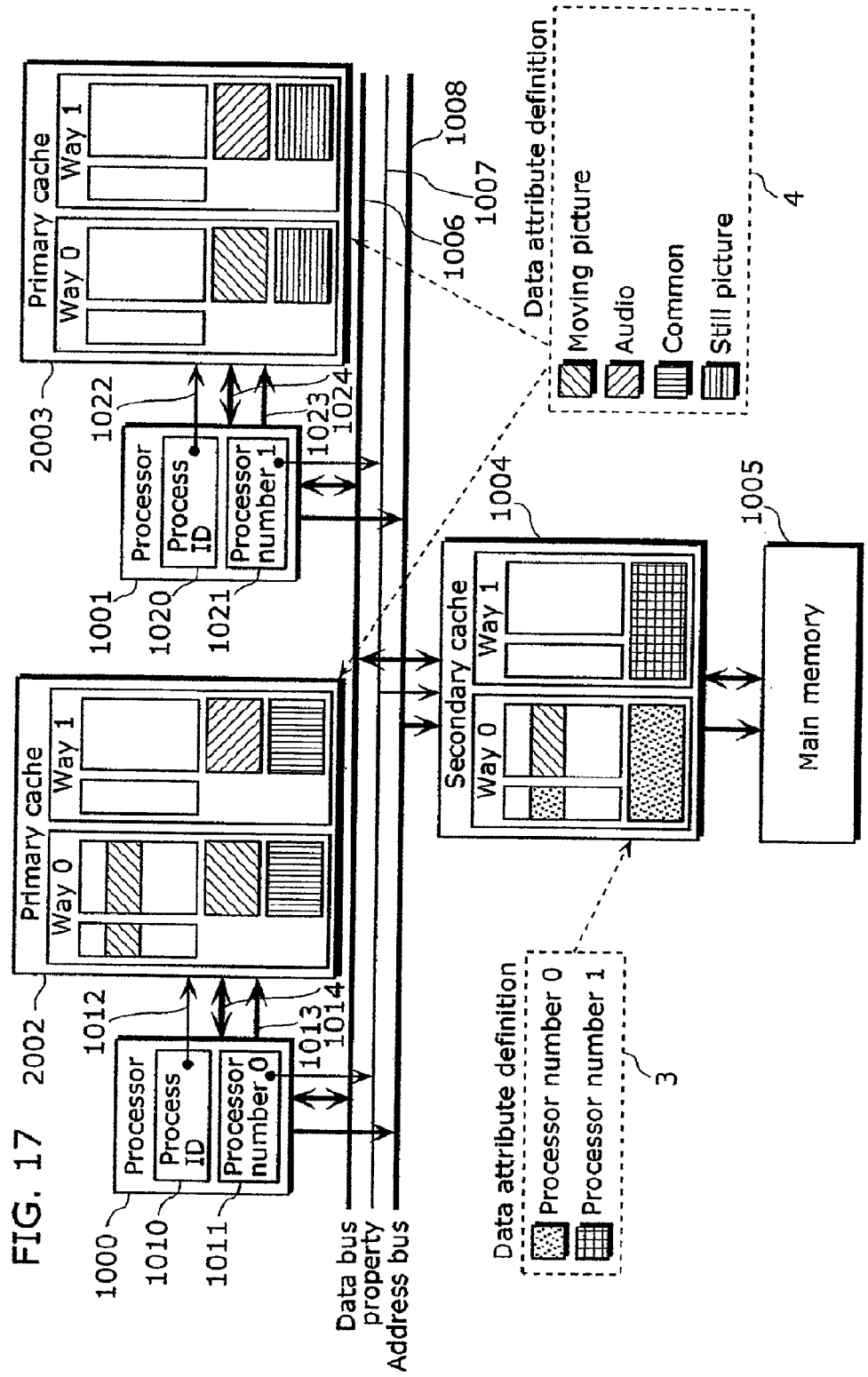
FIG. 17 shows how the system according to the second embodiment operates.

As shown in FIG. 17, the processor 1000 performs moving picture processing, and stores data into the primary cache memory and the secondary cache memory.

Figure 18:
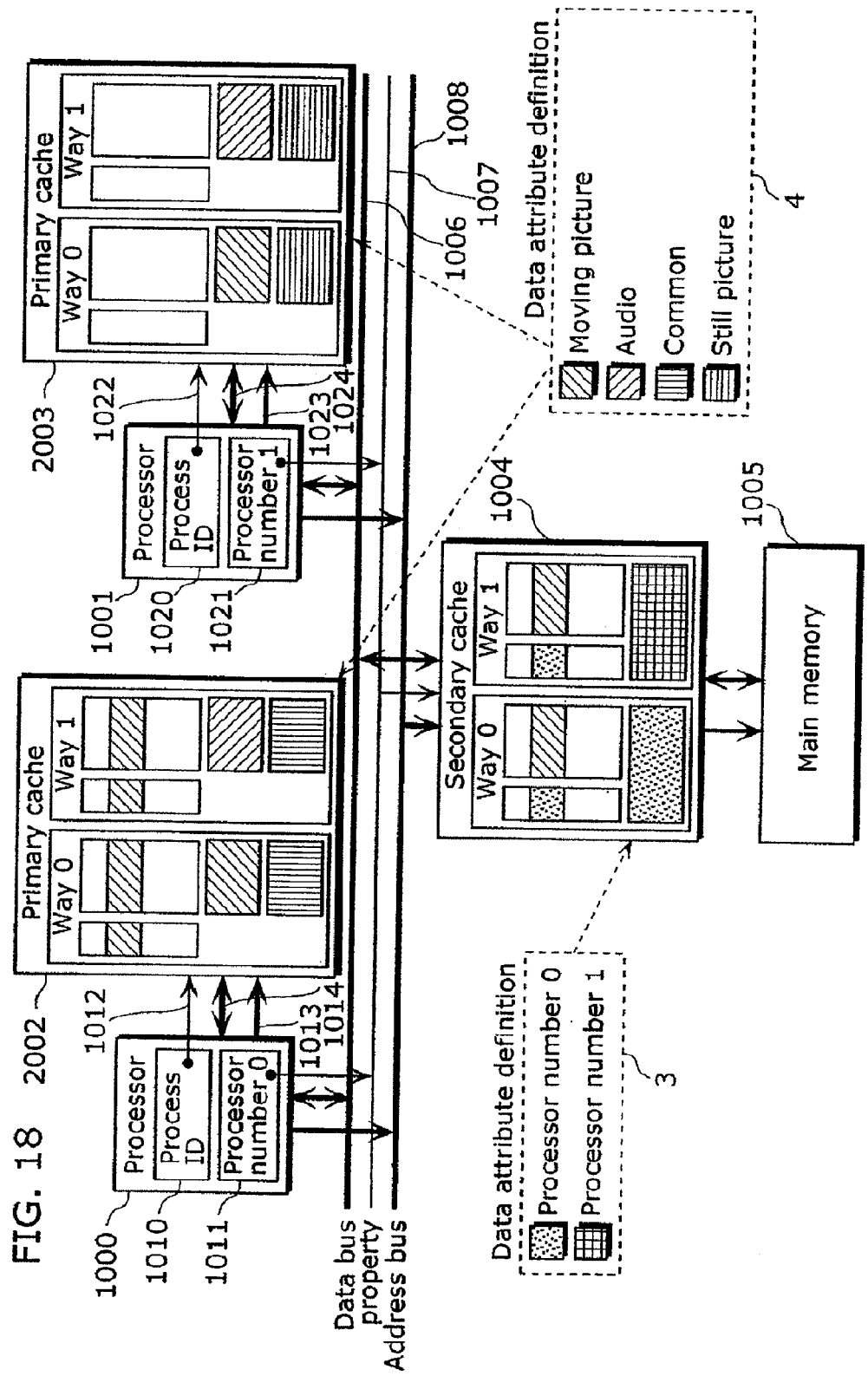
FIG. 18 shows how the system according to the second embodiment operates.

As shown in FIG. 18, the processor 1000 performs again moving picture processing, and stores data into the primary cache memory and the secondary cache memory.

Figure 19:
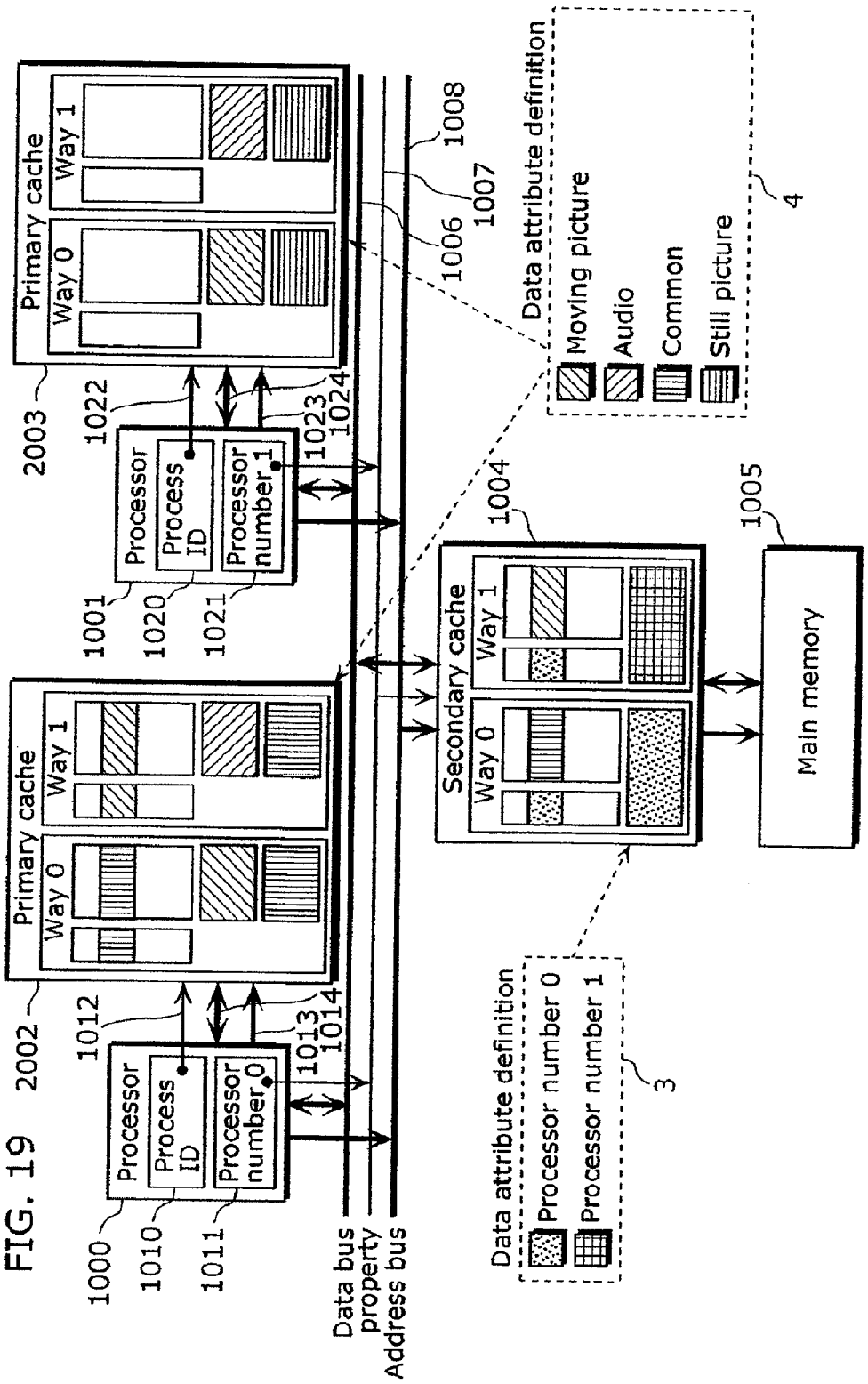
FIG. 19 shows how the system according to the second embodiment operates.

As shown in FIG. 19, the processor 1000 terminates the moving picture processing, starts communication processing, and stores data into the primary cache memory and the secondary cache memory.

Figure 20:
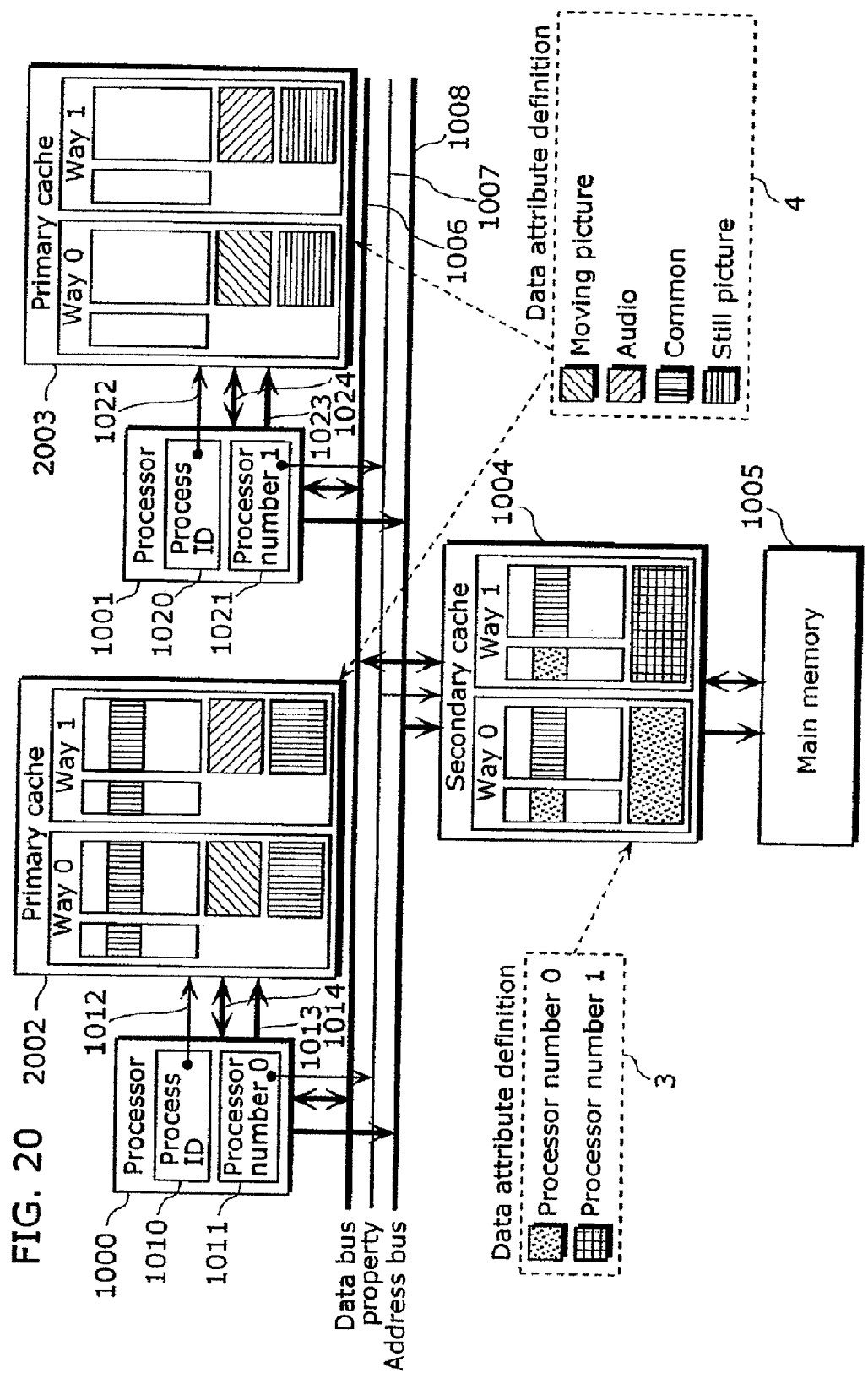
FIG. 20 shows how the system according to the second embodiment operates.

As shown in FIG. 20, the processor 1000 again performs communication processing, and stores data into the primary cache memory and the secondary cache memory.

As described above, by allowing the priority attribute holding unit to hold more than two priority attributes, a vacant area in the cache memory is effectively used in the case where the processing for one attribute is performed exclusively to the processing for another attribute.

Third Embodiment

Figure 21:
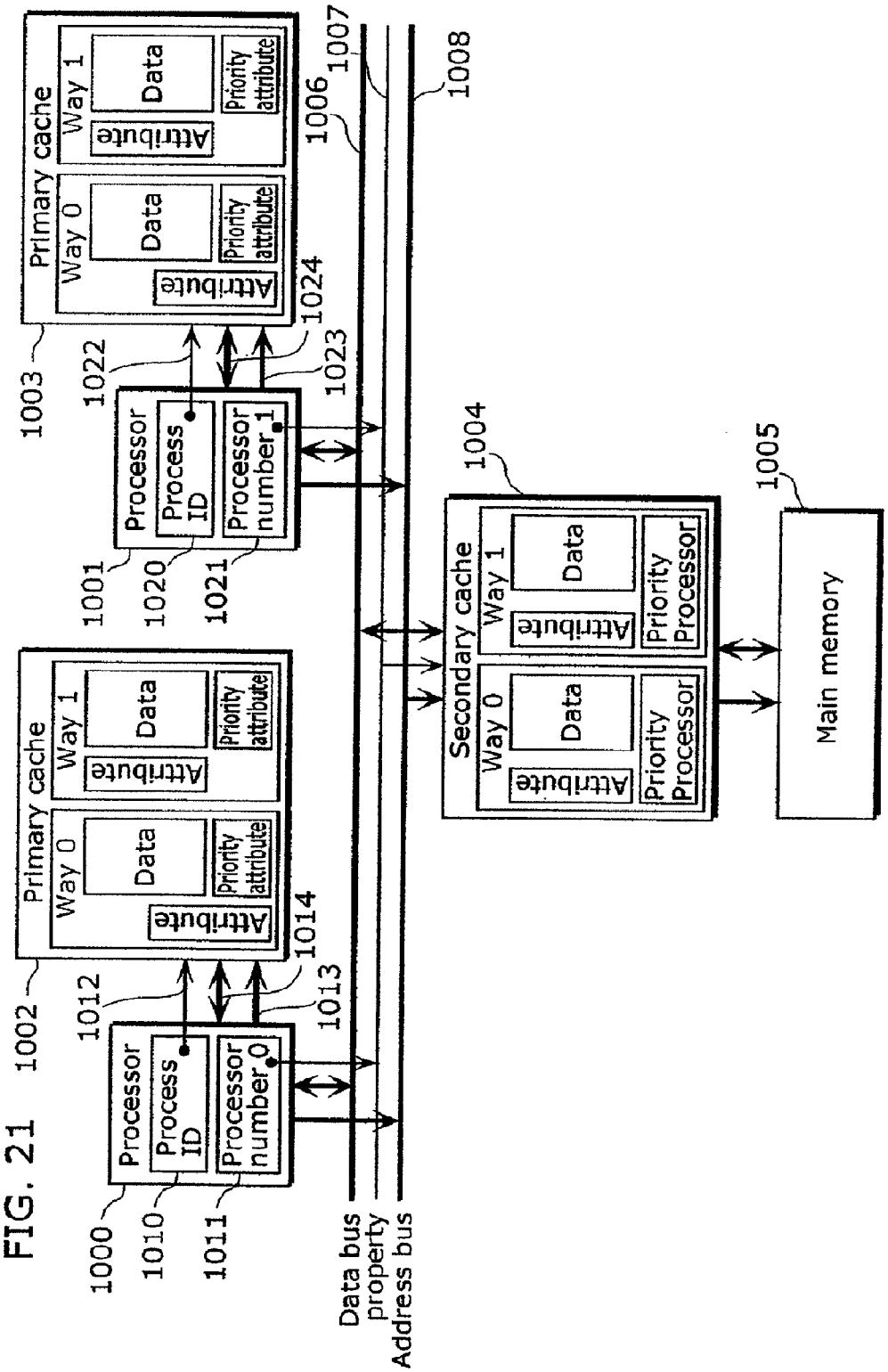
FIG. 21 is a block diagram showing a configuration of a system according to a third embodiment of the present invention.

FIG. 21 is a block diagram showing a configuration of the system according to the third embodiment of the present invention. The system, as compared with the system shown in FIG. 1, is different in that it includes primary cache memories 3002 and 3003 in stead of the primary cache memories 2002 and 2003. The same referential signs are put on the same components, so that the description is not repeated here. The following description mainly focuses on the difference.

The data attribute storing unit in the respective primary cache memories 3002 and 3003 stores, into a Way 0 but not for each entry, only one data attribute of the data stored in the entry of the Way 0, which is different from the system shown in FIG. 1. As a result, the Way 0 stores only the data of priority attribute, and the Way 1 stores data of priority attribute as in the first and second embodiments, as well as data of different priority attribute in the case where a vacant area is found.

Figure 22:
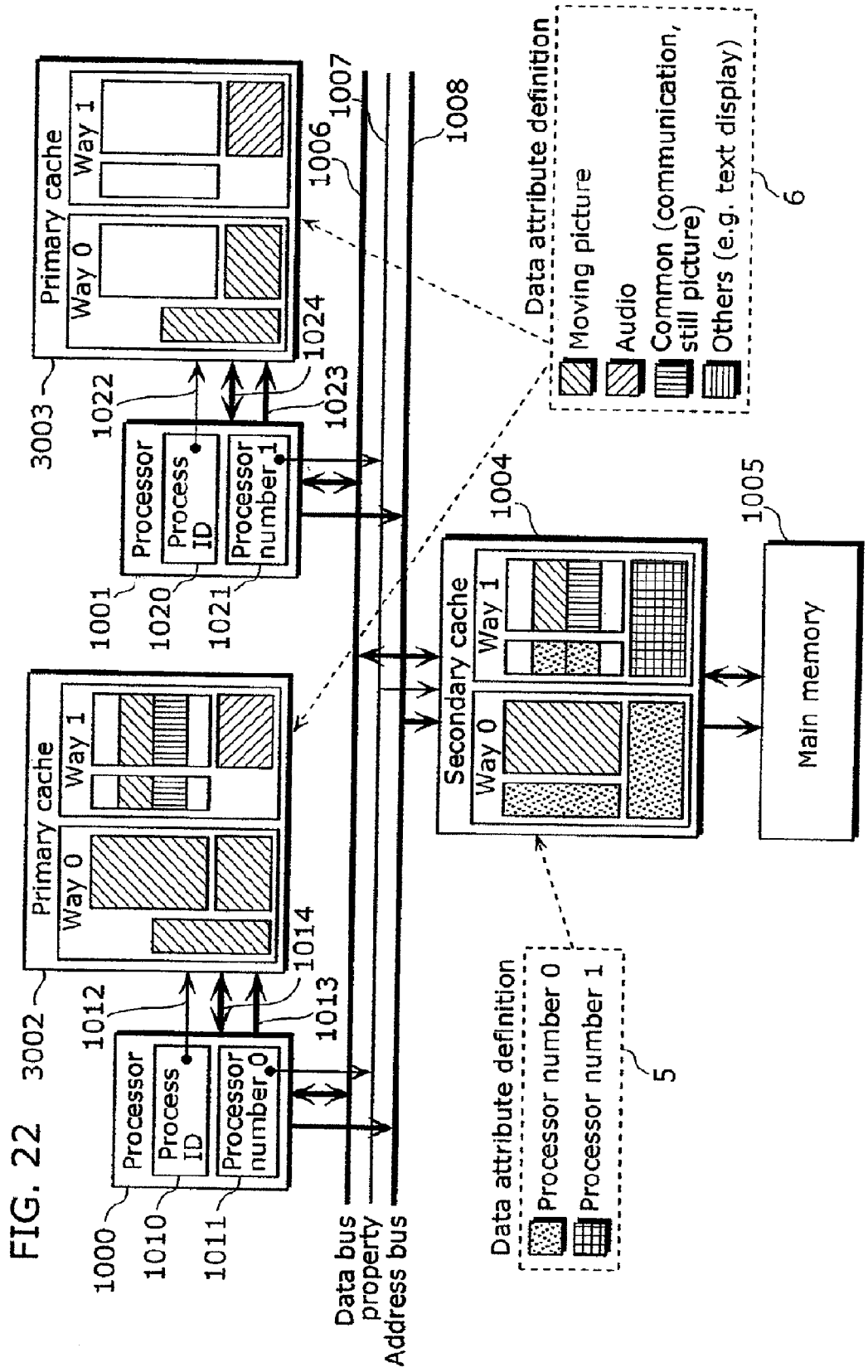
FIG. 22 shows how the system according to the third embodiment operates.

FIG. 22 shows the operation of the system according to the present invention shown in FIG. 21.

As shown in FIG. 22, a data attribute definition 5 indicates patterns for differentiating the data attributes stored in the secondary cache memory, while a data attribute definition 6 indicates patterns for differentiating the data attributes stored in the primary cache memory.

The diagram shows how the cache memory operates after a certain time has elapsed after the operation of only the processor 3000. In the Way 0 of the primary cache memory, moving picture data is stored in sequence. However, data of common attribute is stored in the Way 1 besides audio data. This is because audio data does not have a sequence as moving picture data, and thus the Way 1 has more or less some vacant areas to be effectively used for the data of common attribute.

As described above, the memory assigned for storing data attributes can be used without waste by installing one data attribute storing unit for plural entries that is a part of plural ways in the cache memory, and also by using the unit thus installed for processing data that is in sequence.

Fourth Embodiment

Figure 23:
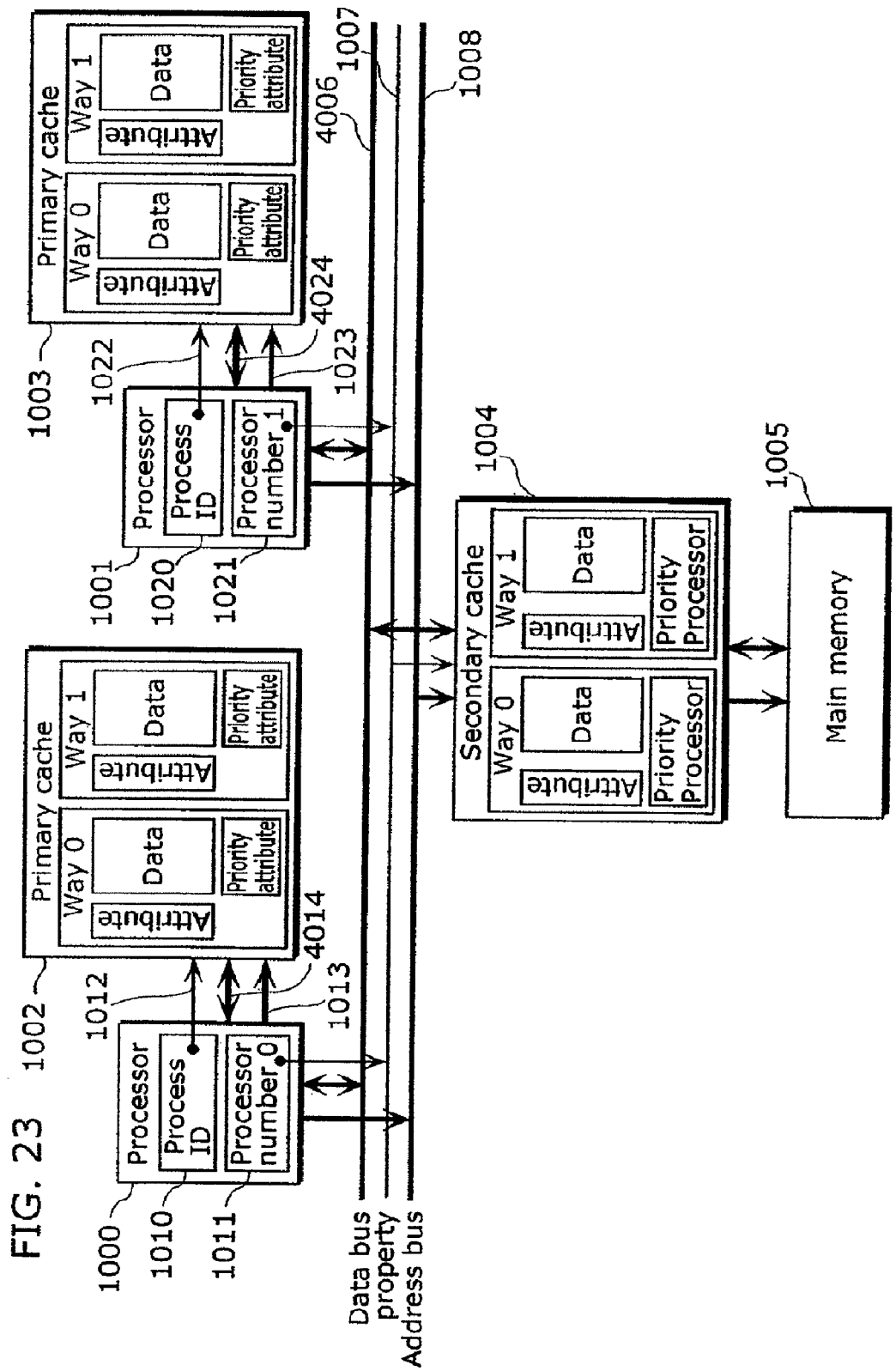
FIG. 23 is a block diagram showing a configuration of a system according to a fourth embodiment of the present invention.

FIG. 23 is a block diagram showing a configuration of the system according to the fourth embodiment. Here, all the cache memories are used for storing instructions. The system in the present diagram is almost as same as the system shown in FIG. 1, but includes an instruction bus 4006, an internal instruction buses 4014 and 4024, in stead of the data bus 1006, the internal data buses 1014 and 1024. These buses may be independent buses or buses that multiplex instruction with data.

Figure 24:
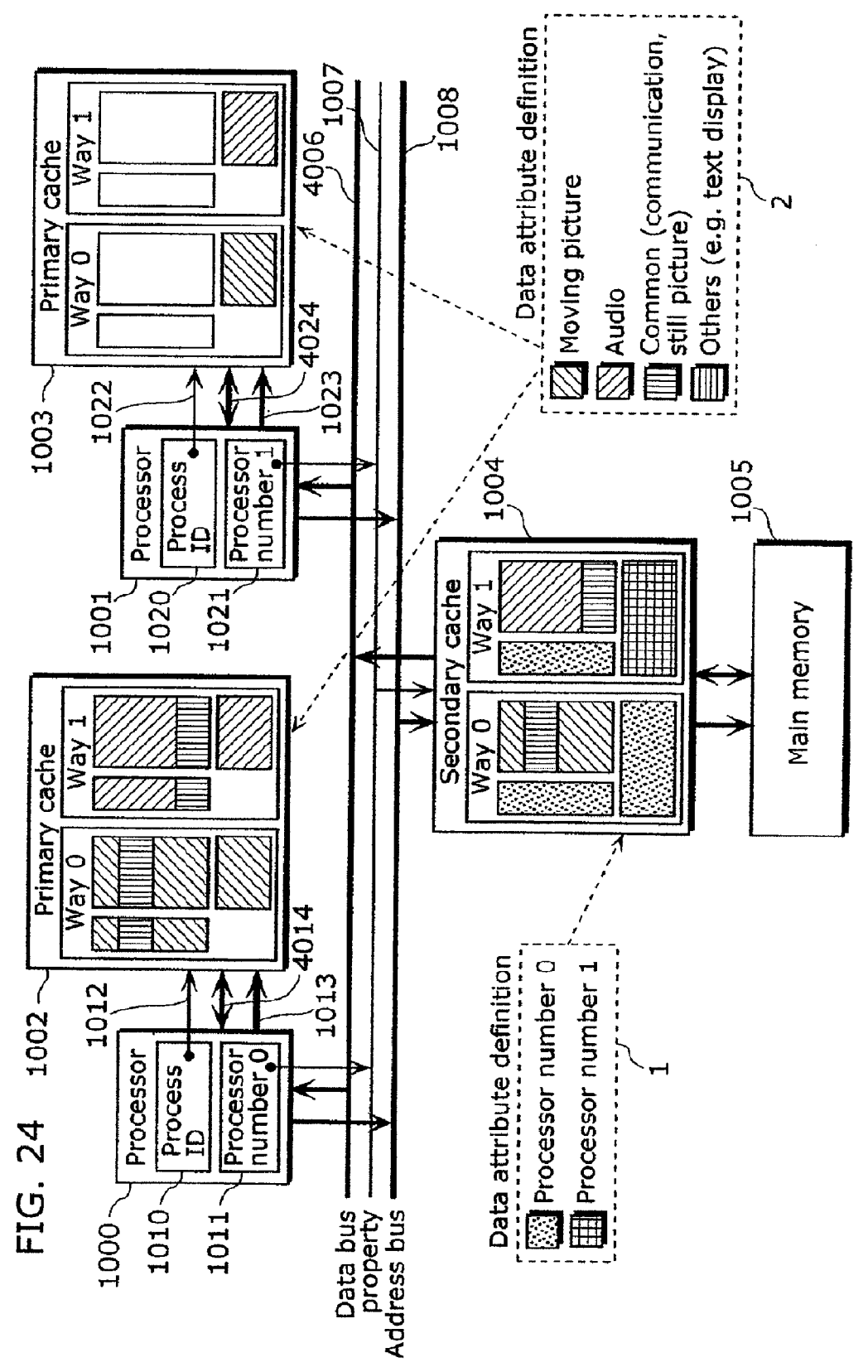
Figure 25:
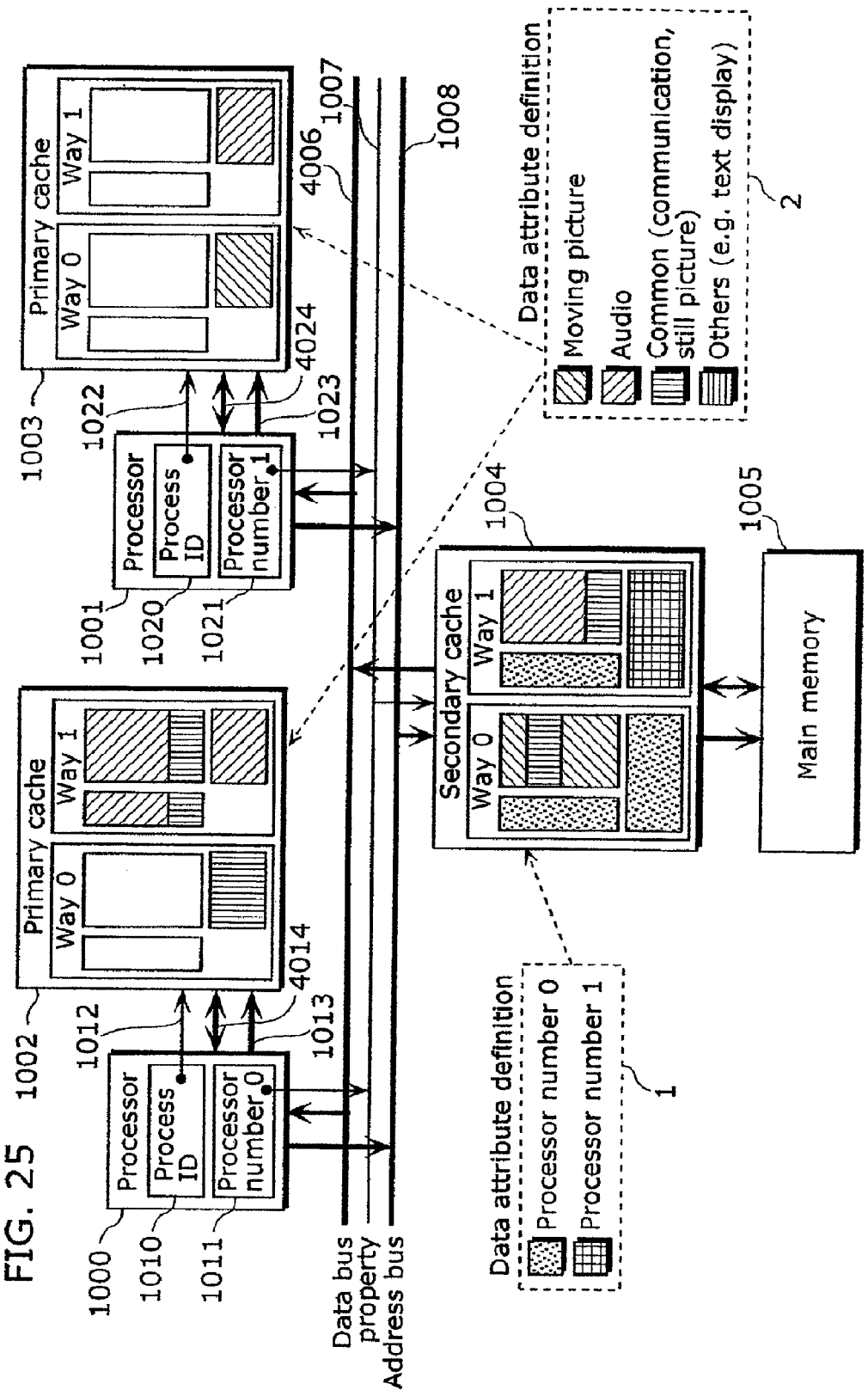
FIG. 25 shows how the system according to the second embodiment operates.

FIGS. 24 and 25 indicate the operation of the system shown in FIG. 23.

As shown in FIG. 24, the processor 1000 with a processor number "0" performs processing for moving picture, audio and communication, and stores an instruction in the primary cache memory and the secondary cache memory. As instructions are in sequence, instructions used in the moving picture processing are stored into most of the entries in the Way 0.

In FIG. 25, after the moving picture processing, data in the Way 0 is invalidated for each entry, and the value indicated by the priority attribute holding unit is changed to be "common". The invalidity of the cache memory is performed by invalidating the value in the valid bit storing unit all at once. The mechanism for executing a program for setting a priority attribute at the time when the OS generates or kills a process is shown in FIG. 26. The cache memory is invalidated by executing this program when the process is killed. For example, the program a1 invalidates, for the Way 0, all the valid bits whose data attribute corresponds to the priority attribute of the killed process.

Unless the Way 0 is invalidated, since the Way 0 is filled with instructions for moving picture processing and communication, there is no space to store instructions for audio processing.

As described above, in the case where an instruction cache memory indicates storage of instructions and when the process is killed, all the valid bits in the way whose priority attribute corresponds to the attribute of the killed process are invalidated. Further pursuit of the effective use of cache memory can be achieved.

Note that, in each of the above embodiments, process IDs are used as data attributes of the primary cache memory, however, upper bits of an address may be used instead. Provided that an upper address of each data can be set so that it does not overlap with another upper address, upper bits of the address may be used instead of the data attributes. In such case, the present invention can be implemented under the system that does not use process IDs.

In each embodiment, a priority attribute is set for each way, however, it may be set for each entry or for each group consisting of plural entries.

Note that in the third embodiment, the Way 0 includes a data attribute storing unit that holds a single data attribute. Such data attribute storing unit, however, may be omitted.

Through the description of the above embodiments, a cache memory applying two-way set associative scheme is disclosed, however, the number of ways may be more than two. Similarly, the number of sets and the size of line data may be different from those described in the embodiments.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is suitable for a cache memory that applies a set associative scheme, and is applicable, for instance, to an on-chip cache memory, an off-chip cache memory, a data cache memory, an instruction cache memory, or the like. The system and the data storage method according to the present invention are suitable for an apparatus that processes plural types of data, such as a DVD recorder, a digital TV, a set top box or a cell phone that performs coding or decoding of moving pictures, or a complex of such devices.

What is claimed is:

1. A system comprising:
a first processor;
a first primary cache memory used by said first processor;
a second processor;
a second primary cache memory used by said second processor; and
a secondary cache memory used by said first and second processors,
wherein said secondary cache memory has a set associative scheme, said secondary cache memory including:
a plurality of ways, each way being made up of entries, each entry holding data and a tag;
a first holding unit operable to hold, for each way, a priority attribute that indicates a type of data to be preferentially stored in that way;
a second holding unit which is included at least in a first way among said plurality of ways, and is operable to hold, for each entry of the first way, a data attribute that indicates a type of data held in that entry; and
a control unit operable to perform replace control on at least one entry by prioritizing a way whose priority attribute held by said first holding unit matches a data attribute outputted from a processor,
wherein when a cache miss occurs and in the case where (i) valid data is held in an entry of the first way among entries that belong to a set selected based on an address outputted from said processor, (ii) all of the following attributes match: the data attribute of the entry of the first way that holds valid data; the data attribute outputted from said processor; and at least one priority attribute of the first way, and (iii) an entry of a way other than the first way does not hold valid data, the entry of the way other than the first way being one of the entries that belong to the selected set, said control unit is further operable to store data into the entry of the way other than the first way.

2. The system according to claim 1,
wherein a priority attribute in said first holding unit is based on processor numbers of said first processor and said second processor.

3. The system according to claim 2,
wherein one of said first processor and said second processor sets, modifies or deletes at least one of the priority attributes in said first holding unit.

4. The system according to claim 1, further comprising,
a rewriting unit which rewrites, when a process is killed, a priority attribute to an attribute indicating "common," the rewritten priority attribute being in said first holding unit regarding a way prioritized by the killed process.

* * * * *